Nov. 26, 1968 R. A. EVANS ETAL 3,412,484
TEST SCORING AND CORRECTING MACHINE
Filed May 12, 1966 7 Sheets-Sheet 1

Nov. 26, 1968     R. A. EVANS ETAL     3,412,484
TEST SCORING AND CORRECTING MACHINE

Filed May 12, 1966     7 Sheets-Sheet 2

FIG. 2

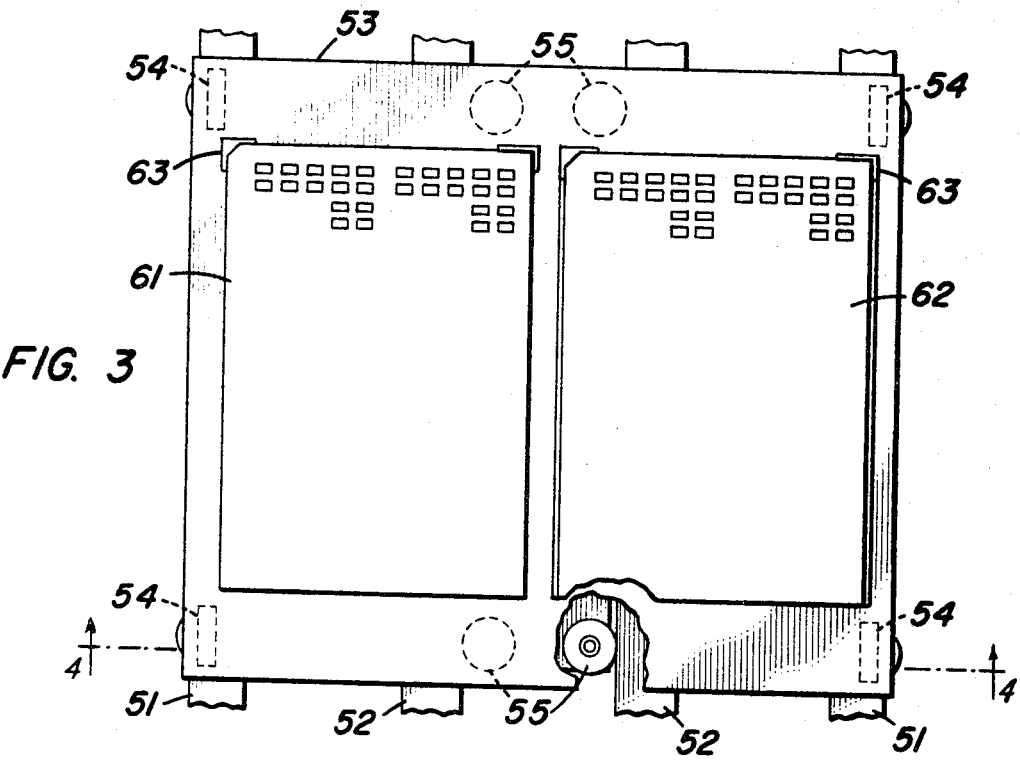
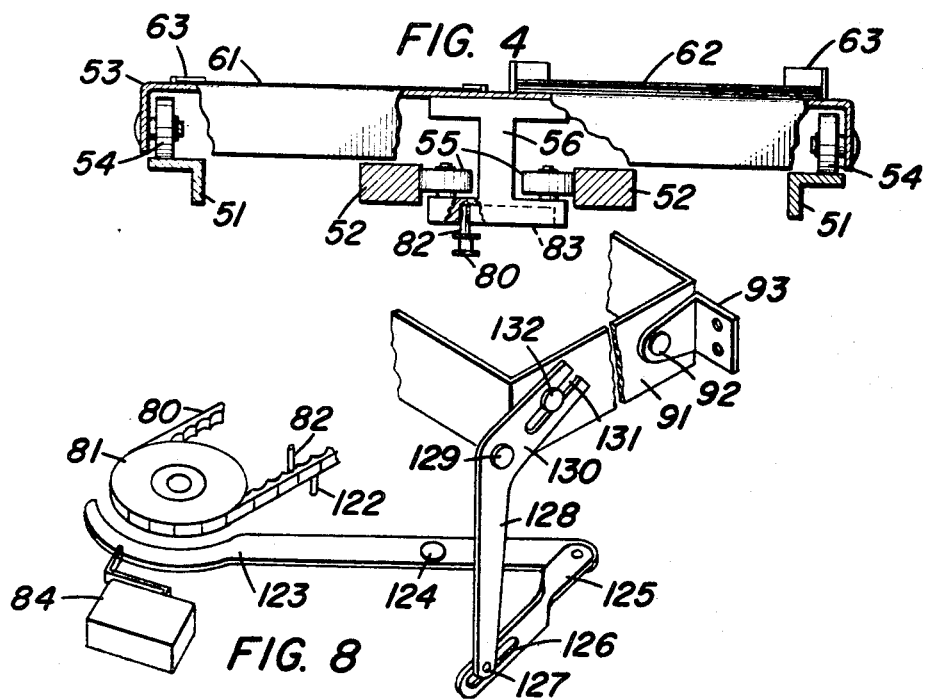

Nov. 26, 1968          R. A. EVANS ETAL          3,412,484
                TEST SCORING AND CORRECTING MACHINE
Filed May 12, 1966                              7 Sheets-Sheet 4
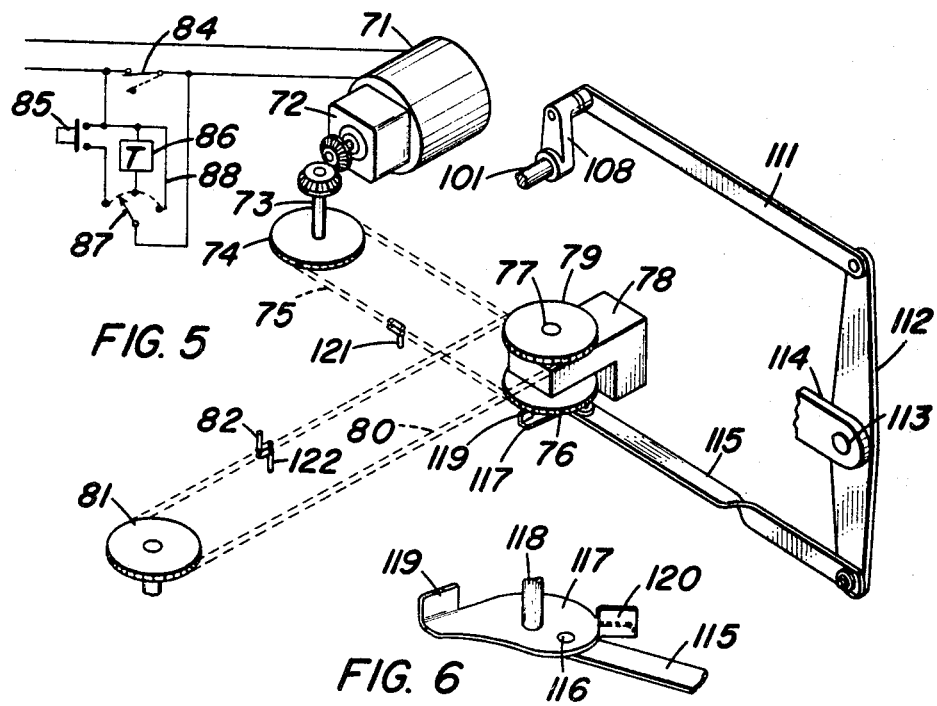
FIG. 5
FIG. 6
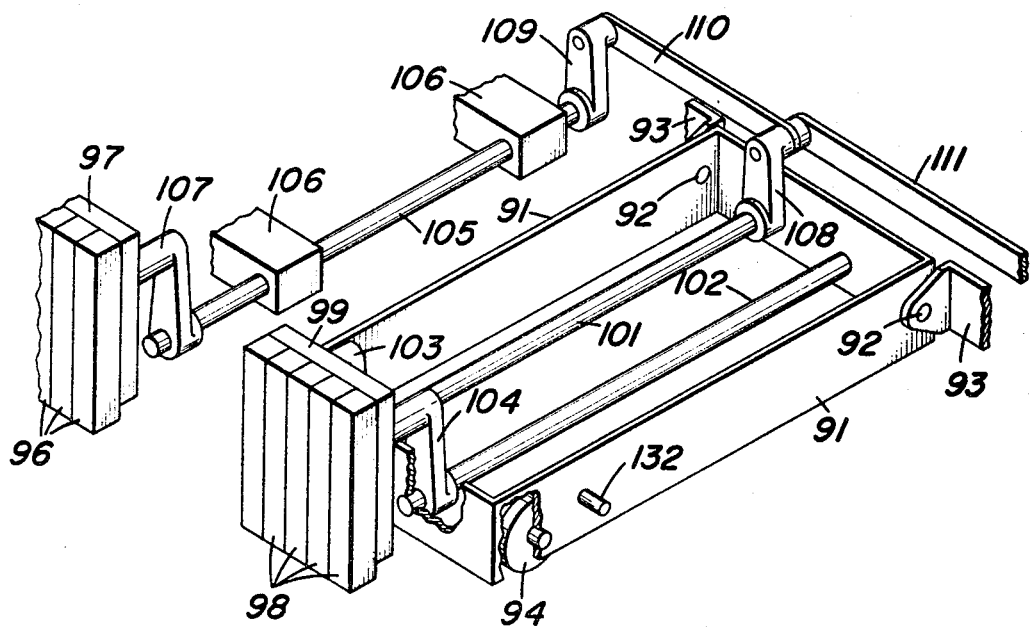
FIG. 7

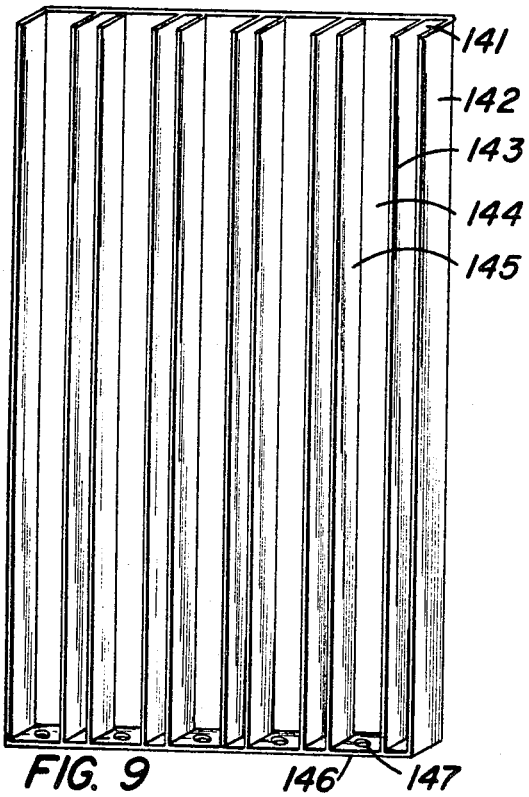
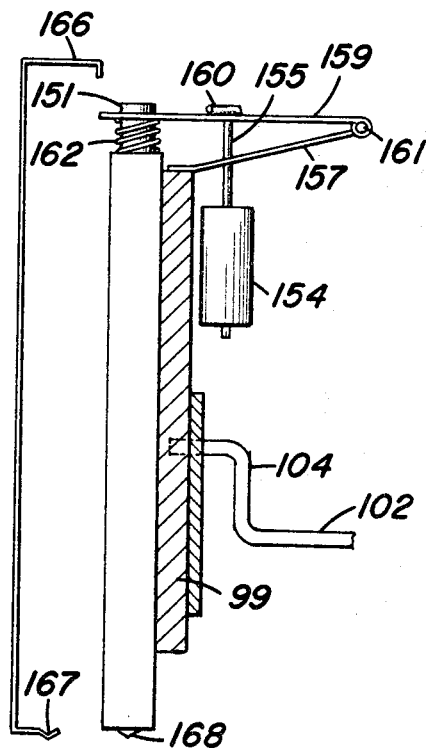
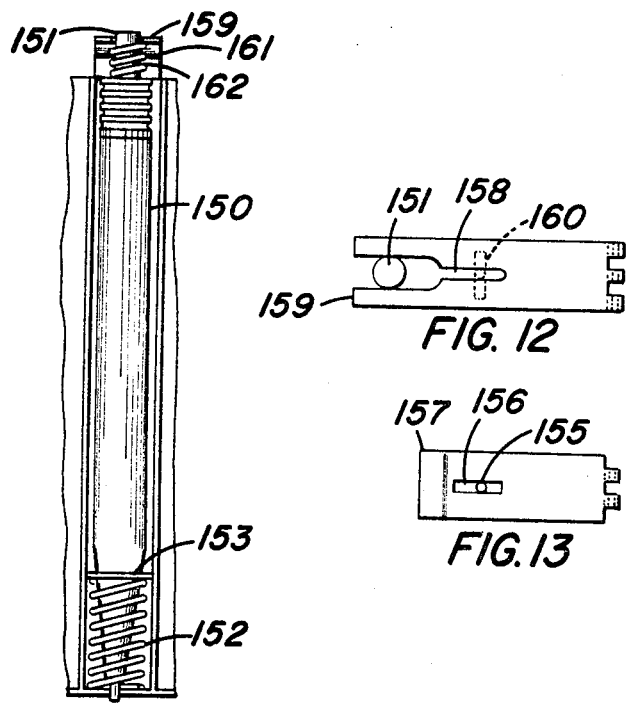
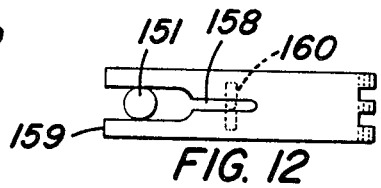
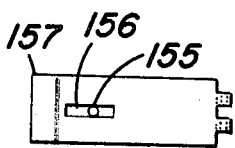

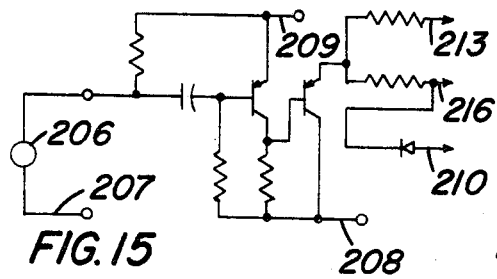
FIG. 15
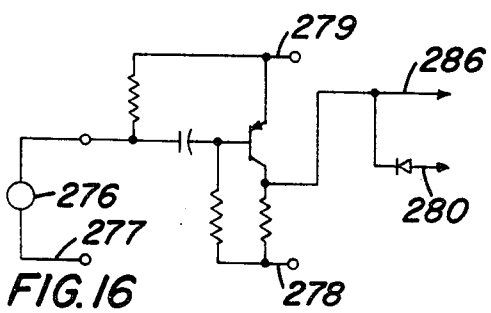
FIG. 16
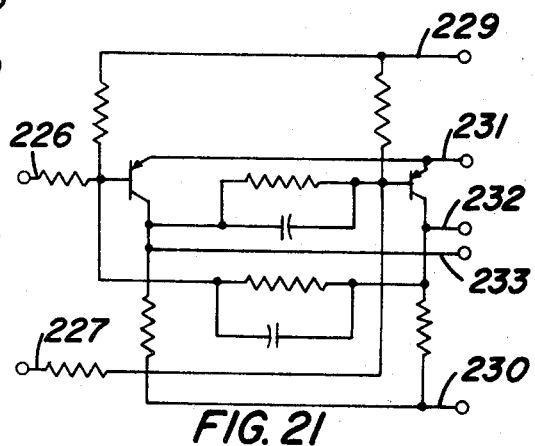
FIG. 21
FIG. 17
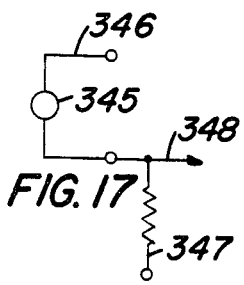
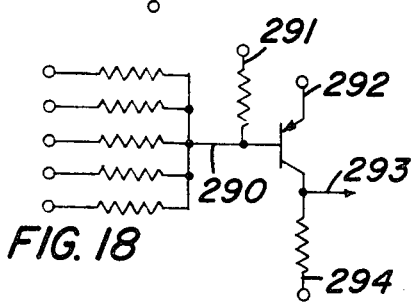
FIG. 18
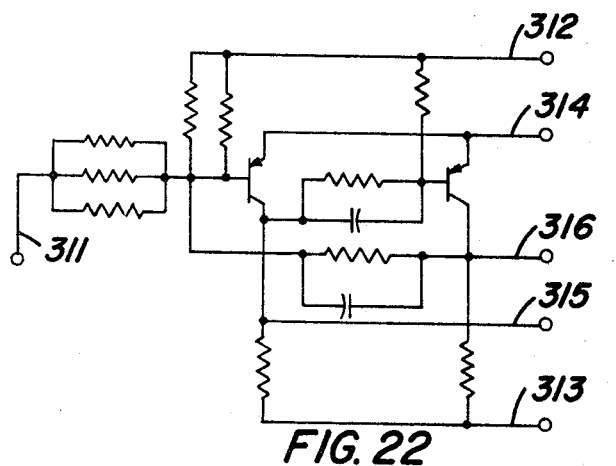
FIG. 22
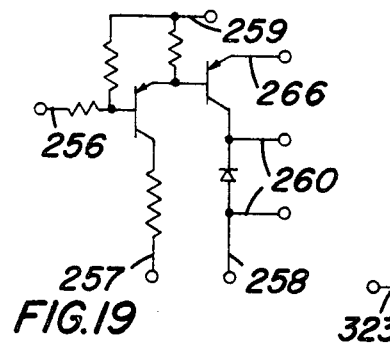
FIG. 19
FIG. 20
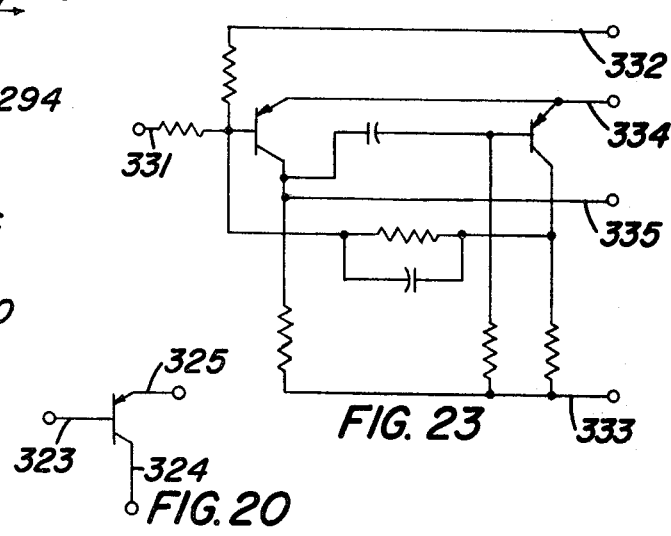
FIG. 23

3,412,484
TEST SCORING AND CORRECTING MACHINE
Ralph A. Evans, Chapel Hill, N.C., and Kenneth E. Gell, Naples, N.Y.; said Evans assignor to Loran S. Clark, Gloversville, N.Y.
Filed May 12, 1966, Ser. No. 549,616
14 Claims. (Cl. 35—48)

ABSTRACT OF THE DISCLOSURE

A test scoring machine in which multiple choice answer sheets are scanned synchronously, and electrically compared with a key sheet. Scanning is bidirectional, the left hand side of each sheet being scanned on one pass and the right hand side on the other. The answer sheets are stacked on a carriage, and the answer sheet sensors are vertically adjusted automatically to remain at constant spacing from the top sheet of the stack. Crayon marking devices are automatically actuated to mark the correct answer in the event of a wrong or skipped answer.

---

This invention relates to a test scoring machine, and to a combined test scoring and correcting machine useful to teachers and others in grading and correcting tests or examinations of the multiple-choice answer type.

An object of the invention is the provision of a generally improved and more satisfactory test scoring machine.

Another object is the provision of a test scoring machine having means for marking the answer sheet to indicate the correct answer for those questions which were not answered correctly, thus greatly assisting the student in quickly finding his mistakes when the answer sheet is handed back to him after having been processed by the machine. A machine having this desirable feature may be properly described as a test scoring and correcting machine, rather than merely as a test scoring machine.

Another object is the provision of a machine which can be programmed simply by marking the correct or acceptable answers on a master sheet or key sheet which is a duplicate of the answer sheets used by the students, then placing the key sheet in the machine along with one or more answer sheets so that the machine may compare the answers marked on each answer sheet with the acceptable answers marked on the key sheet, question by question. When more than one answer sheet is placed in the machine, the single key sheet stays in the machine for repeated use in comparing the answers on each successive answer sheet with the marked answers on the key sheet.

Still another object is the provision of a machine which, upon processing each answer sheet, will count up and displus visually what may be called the "raw" score of that sheet, giving either the number of correct answers or the number of wrong answers, whichever may be desired by the person using the machine.

A further object is the provision of a machine so designed and constructed that any desired question or questions on the answer sheet may be disregarded in arriving at the proper score, by the simple expedient of not marking on the key sheet a correct answer for the question or questions which are to be disregarded. This feature enables the teacher, when scoring the answers, to disregard a question which has been found to be improper or erroneous, and it also enables the teacher to use the machine to obtain sub-scores of a selected group of questions among the entire number of questions which were asked, by running the answer sheets through the machine again with a key sheet marked only for the questions which are to be sub-scored.

A still further object of the invention is the provision of a machine performing some or all of the above described functions, so designed and constructed that a stack or pile of answer sheets (containing up to about 100 sheets, for example) may be placed in proper position and the machine, when set into operation, will then proceed to score the successive answer sheets one by one, with only minimum manual attention such as the mere removal of the top answer sheet from the stack after the scoring of the top sheet has been completed, and perhaps the pressing of a starting button to initiate the next scoring cycle.

Another object is the provision of such a machine so designed that it may be operated at such a speed (e.g., score about 6 or 7 answer sheets per minute, or one every 8 or 10 seconds) that the attendant has time to write down the raw score shown on the machine in a teachers class book, during the operating cycle for scoring the next succeeding answer sheet, thus permitting the two essential tasks of scoring-and-correcting, and of recording the results, to be done practically at the same time. In this connection, it may be desirable to drive the machine from a two-speed motor, so that it may be operated at a faster speed whenever it is not necessary to allow time to write the scores in a class book; e.g., if the teacher is to go over the individual answer sheets later and note the scores from markings which the machine has placed on the individual sheets, or if he wishes to analyze the answers of the class as a whole to certain questions or groups of questions, for which purpose he can run the answer papers through the machine rapidly and then note the cummulative totals from a cummulative totalizing register. Alternatively, instead of a two-speed motor, the machine may be driven by a single speed motor at the higher speed just mentioned, when this is appropriate, and when slower speed operation is desired the drive may be interrupted at the end of each cycle and may be started again after an appropriate waiting period, either by an automatic timer or by a manual push button. The use of a single speed motor which is stopped and restarted between cycles, will usually be more economical than a two-speed motor, and equally satisfactory for enabling the machine to be operated at different speeds when required.

Still another object is the provision of a machine performing some or all of the above mentioned functions, which is sufficiently compact and portable, and especially is sufficiently low in cost, so that one or several such machines may be supplied to each school building, enabling a machine to be readily at hand for convenient use by each teacher whose subject lends itself to testing by the multiple-answer technique. As distinguished from this, many or all of the prior art test scoring machines are so expensive, or so bulky, or both, that it is feasible to have them only in one, or a comparatively few central locations, usually outside of the school building where the tests have been given, so that it is inconvenient or impossible for the teacher to use them regularly in the day-by-day or even week-by-week testing of the students. The usefulness of these expensive machines is thus confined largely to the occasional testing of large groups of students, the answer sheets being sent to the central location outside the school building for processing. The present machine, on the contrary, may be called a classroom teacher's machine, located right in the school building, possibly even in the classroom itself. This enables the answer sheets of one class to be processed quickly and returned to the class (to show the students their mistakes) the next day or the next time the class meets.

A further object is the provision of a test scoring machine so designed that a basic structure is common to a plurality of variant models, requiring only minor changes to differentiate one model from another, thus enabling the economy of mass production of the basic structure coupled with availability of modifications at modest extra expense. For example, a "standard" model of the machine may include the above mentioned marking feature for placing on each answer sheet a mark to indicate the right answer to every question which was not answered correctly by the student, and it may combine unanswered or "skipped" questions with those definitely answered "wrong," in arriving at the total of wrong answers. An "economy" model of the machine may be the same as the standard model except for omission of the mechanism for marking the right answer when the question was not answered correctly. A "special" or "de luxe" model may be the same as the standard model except that in addition to registers for counting right answers and wrong answers, there may be a separate register for totaling the unanswered or skipped questions, instead of combining them with those answered wrong. A "print out" model may be the same as the standard model except for the addition of printing wheels to print the score on the answer sheet, and selection switches to determine whether the score printed shall be the number of right answers or the number of wrong answers. And another model may be the same as any of the above, with the addition of an automatic paper feed mechanism to eject the top sheet from the pile or stack of answer sheets, upon completion of each processing cycle, thus obviating the need to remove the scored sheet manually. Yet all of these use the same basic structure, both mechanically and electronically, thus enabling the basic structure to be manufactured economically for use in any desired one of these models.

A still further object is the provision of a machine which may be programmed extremely easily and quickly, merely by marking an answer sheet with the correct answers, and using this marked sheet as a "key" sheet, placed in the machine alongside the sheets which are to be scored. It is worthy of note in this connection that if two or more answers of a multiple-choice question are correct, this presents no special difficulties in the machine of the present invention. The key sheet is simply marked with all of the choices which will be accepted as correct answers to the question. The machine will then score the student's answer sheet as correct, with respect to that question, if the student has marked one or more of the correct choices and has not marked any incorrect choice. But if any incorrect choice has been marked by the student, the machine will count the answer as wrong, regardless of the fact that the student may have also marked one or more of the correct choices. The same principle applies to questions which have only one correct answer, rather than a plurality of correct answers; that is, if a student has marked a wrong answer or choice, the machine will count the question as having been answered "wrong" even though the student did also mark the right choice. This eliminates any benefit from "fudging" an answer, a practice, indulged in by some students in the hope that if several answers to one question are given and one of them turns out to be right, the answer will be counted as correct.

Another object of the invention is the provision of a scoring machine so designed that it will respond accurately to marks made on the answer sheet by several kinds of commonly used marking implements, such as a lead pencil, an ink pen, or a ball point pen, without requiring the use of a special marking or indexing tool (such as a stylus or a special pen or crayon) when marking the answer choices, as required by certain machines of the prior art. Hence if a lead pencil is used, the student may quite properly erase his first answer, and choose a different answer before he turns his paper in.

Still another object is the provision of an improved scoring machine so designed and constructed that each question need not have the same number of answer choices, and questions having different numbers of answer choices may be mixed with each other in any desired sequence. For example, a question having a five-choice answer may be followed by one having only two choices, followed in turn by a four-choice answer, then three, then five again, and so on. This makes no difference to the machine of the present invention, and causes no complications in the electronic circuitry or otherwise.

A further object is the provision of a scoring machine which will give, between optional resettings, a cumulative total of the number of answer sheets processed and the total number of right or wrong answers on all the sheets processed, thus enabling the easy calculation of the class average of correctness, for comparison with the score of any individual student, or for comparison with the average of the same class on a previous test or tests, or comparison with the average of a different class on the same test. Thus valuable education information is easily obtainable for the teacher and the student, and also for the school administration, which may easily compile meaningful statistics not readily available with the prior art methods and machines.

These and other desirable objects may be attained in the manner disclosed as an illustrative embodiment of the invention in the following description and in the accompanying drawings forming a part hereof, in which:

FIG. 2 is a face view of an answer sheet for use with the preferred machine of the present invention, with markings thereon indicating a typical manner of use;

FIG. 3 is a plan of a paper carriage or tray for holding an answer key sheet and one or a stack of students' answer sheets, showing a key sheet and an answer sheet in place on the carriage;

FIG. 4 is a transverse vertical section through the carriage and associated parts, taken approximately on the line 4—4 of FIG. 3;

FIG. 5 is a somewhat schematic perspective view of the drive mechanism for driving the paper carriage and shifting the sensing heads from one reading position to another;

FIG. 6 is a fragmentary perspective view better illustrating some of the mechanism partially hidden from view in FIG. 5;

FIG. 7 is a perspective view, with parts broken away, illustrating the shiftable mounting of the sensing or scanning heads;

FIG. 8 is a fragmentary perspective view showing the mechanism for lifting the answer sensing heads at the end of each complete reading cycle;

FIG. 9 is a perspective view of part of the answer sensing or reading head assembly, illustrating particularly the arrangement of compartments for holding the lamps and sensing photocells and the marking tools for marking the correct answer on the sheet being scanned or read, when the student has not given a correct answer;

FIG. 10 is a schematic partly exploded view partly in side elevation and partly in vertical section, illustrating certain features of the mechanism for actuating one marking tool to make a mark;

FIG. 11 is a front elevation, with parts removed, of one of the marking tools in its compartment, illustrating further details of the mounting and actuating mechanism;

FIG. 12 is a plan of the upper one of two leaf springs forming part of the marker actuating mechanism;

FIG. 13 is a plan of the lower one of these springs;

FIG. 15 is a diagram illustrating further details of a photocell unit for sensing or scanning a part of the key sheet or master sheet, several such units being included in the circuit illustrated in FIG. 14;

FIG. 16 is a similar diagram of a photocell unit for sensing part of a student's answer sheet;

FIG. 17 is a diagram of another type of photocell unit for use in connection with a lamp for illuminating the answer sheet;

FIG. 18 is a diagram showing the details of another logic component indicated only in block form in FIG. 14;

FIG. 19 is a diagram illustrating details of an amplifier component indicated in block form in FIG. 14;

FIG. 20 is a diagram illustrating details of an emitter follower component included in the circuit of FIG. 14;

FIG. 21 is a diagram showing details of a flip-flop component used in the circuit of FIG. 14;

FIG. 22 is a similar diagram of a Schmitt trigger component used in the circuit of FIG. 14;

FIG. 23 is a diagram showing details of a one-shot or monostable multivibrator component forming part of the circuit of FIG. 14.

General outline

Figure 1:
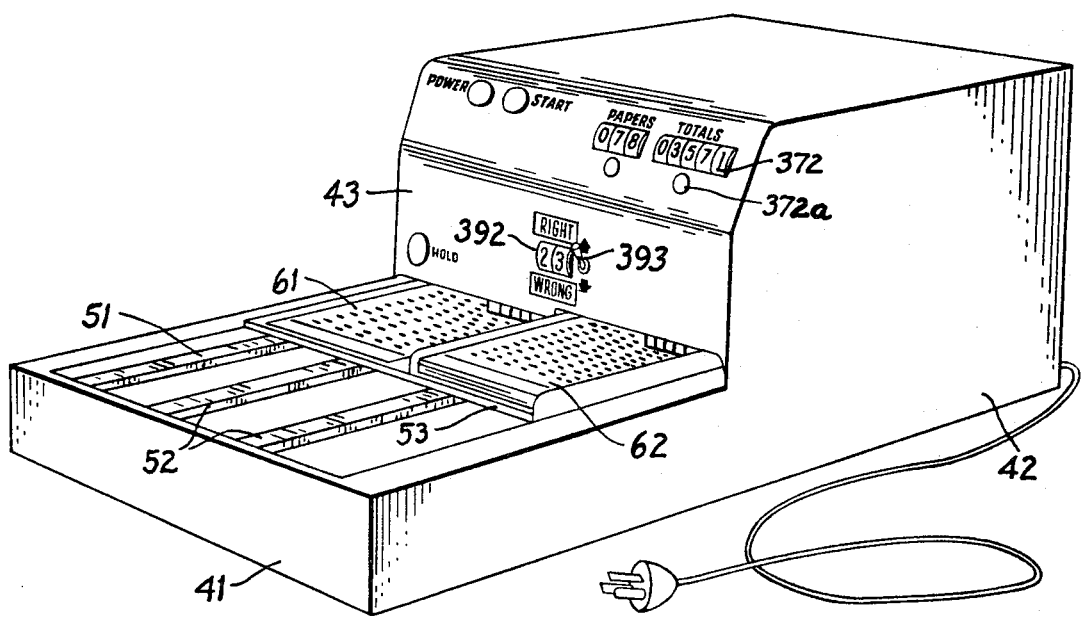
FIG. 1 is a perspective view of a machine in accordance with a preferred embodiment of the invention.

At this point it may be helpful to give a very brief outline of the general features of construction and operation of the machine according to the present invention. The machine is used with pre-printed answer sheets of paper, the sheet having successive rows of blocks or rectangles, each row representing a different question, and each block or rectangle in that row representing a different answer to the question, that is, a different choice of the various alternatives. Conveniently, and in the preferred embodiment of the invention, there are five blocks or rectangles in each row, representing five different choices or answers to the question. This is merely a convenient example, however, and the same principles would apply if it were desired to use more or less than five choices for each answer. It is not necessary to use all of these just because five are provided, and the answer sheets and the mechanism of the machine will serve equally well for scoring questions which have only two answer choices, such as questions of the "true or false" type. If provision is to be made for up to five choices, which is satisfactory for most classroom testing, the answer sheet may conveniently be arranged in two main columns, each main column having the desired five choice positions spaced laterally across the column.

The machine has a paper carriage or tray, movable horizontally from a loading position at the front of the machine, rearwardly and then forwardly again. On one part of this tray a single answer sheet or a stack of similar answer sheets is placed; and on another part of the tray is placed a single key sheet or master sheet, similar to the answer sheets prepared by the students, but marked by the instructor or teacher to indicate the correct answers. As the tray moves rearwardly, electonic circuits including photocells serve to sense or scan or read the answer markings which a student has placed on the top answer sheet of the stack or pile of answer sheets on the carriage or tray, and simultaneously to scan the markings on the key sheet, and compare the results of the scanning in a manner to differentiate between correct answers and those which are not correct, and operate a totalizer or register to total either the correct answers or the incorrect answers, whichever may be desired by the operator. As the paper carriage moves rearwardly, the scanning photocells are arranged over one of the main columns of the answer sheet and the corresponding main column of the key sheet; then when the carriage reaches its rearward limit of travel, the photocell assemblies are shifted to place them over the other main columns of the answer sheet and the key sheet, respectively, whereupon the carriage moves forward and the machine scans the answers in the second main column. Thus by the time the carriage has completed its backward and forward travel, constituting one cycle, both columns of answers have been scanned, and the register or totalizer will show the total number of correct answers or the total number of incorrect answers, as the case may be, of that particular answer sheet being scored. The sheet which has been scored is then removed from the top of the stack or pile, and the next cycle is started, the paper carriage again moving rearwardly and then forwardly, to scan first one and then the other main column of the next answer sheet. Meanwhile, the totalizer or register has been automatically reset to zero, so that at the end of the scanning operation of the next answer sheet, it will correctly show the total for that particular sheet. But in addition to the register reset at the end of each cycle, here is preferably another register or totalizer which is not rest except at the end of the complete run of processing all of the answer sheets, so that it shows a cumulative total of the correct answers (or the incorrect ones, if desired) for the entire group of papers being processed, and preferably another register which merely counts the number of papers being processed.

An optional feature of the machine, and one which is extremely valuable when it is included, is the feature that when the student's answer to any particular question is not correct, the machine automatically marks the correct answer to that question, on the student's answer sheet or paper. Thus when the answer sheet is handed back to the student after the answers of the entire class have been processed, the student can see quickly where he made his mistake, while the matter is still comparatively fresh in mind.

It will now be convenient to describe in detail first the preferred arrangement of the answer sheet, next the mechanical construction of the machine, and then the electrical or electronic circuits which serve to differentiate between correct answers and incorrect answers as marked by the student on the answer sheet.

Answer sheet

Referring now to FIG. 2, there is shown a typical form of answer sheet suitable for the purposes of the present invention, and containing space for answers for 72 questions, with five choices for each question. Merely to give typical dimensions, without thereby limiting the invention, the answer sheet may be 5½ inches wide by 8½ inches long, which is a convenient size since it cuts economically and without waste from standard stock sizes of paper, such as 8½ by 11, or 17 by 22. Preferably the answer sheet is of white paper, but a rather inexpensive grade of such paper is satisfactory, such as the kind of paper often used with a rotary duplicating machine and often called "Mimeograph" paper. Before being used as an answer sheet the paper is printed to provide suitable spaces for desired data, in addition to the various spaces for marking the student's choices of the various answers. Thus there may be blocks or spaces, extending across the top of the sheet, through a depth of about 11/16th of an inch, for recording the student's name and any number assigned to this particular student, also the test number, also a space for the whole score achieved on the entire group of questions, and another space for a sub-score achieved on certain selected questions among the entire number of questions. These various spaces appear clearly in FIG. 2, without the need for using reference numerals to identify them.

At the bottom of the sheet, through a depth of about 5/16th of an inch, there may be other spaces for other data, repeating here the student's number if desired, or including any other desired information. Thus the vertical space available for the answers themselves, assuming the dimensions above given, is 7½ inches.

Within this available space 7½ inches high and 5½ inches wide, the answer choices may be arranged in two main columns as shown, the left hand column containing spaces for the answers to questions 1 through 36, as indicated, and the right hand main column containing spaces for the answers to questions 37 through 72. As illustrated, each question has five separate answer spaces. As shown, successive questions are identified by successive numbers in a sub-column at the left hand edge of each main column, and the five choices for each answer, each having its own small rectangle, are identified respectively by the capital letters A, B, C, D, and E, placed just to the left of the rectangle to which each letter relates. Each rectangle may conveniently be 0.2 of an inch wide (in a horizontal direction) and 0.1 of an inch high (in a vertical direction) with a horizontal spacing of 0.2 of an inch between successive rectangles in the same main column, and a vertical spacing of 0.1 of an inch between successive horizontal rows of rectangles. The designating letters A, B, etc., are placed in the centers of the spaces to the left of the rectangles to which they relate. There is a clear central space or margin of 0.3 of an inch extending vertically between the two main columns of answers, and right and left margins of 0.3 of an inch at the right and left edges of the sheet. As already mentioned, the above dimensions are given merely as typical examples of dimensions which have been found satisfactory, and are not intended as a limitation upon the invention.

*Mechanical construction*

Referring now to FIG. 1, the machine in its preferred form comprises a casing or housing having a comparatively low front part 41 and a substantially higher rear part 42, the front wall 43 of the rear part constituting what may be called a console or instrument panel. While various switches, buttons, control elements, registers, etc., may be mounted in any location desired, it is preferred to mount them on the instrument panel 43.

When the answer sheets have the typical dimensions above mentioned, the casing or housing of the machine may have a width of about 14 or 15 inches, a depth (front to back) of about 22 inches, and a height (from the table or desk on which it rests, to the flat top wall of the high part 42 of the casing) of about 10 inches. These typical dimensions, given as an example, are not intended as a limitation on the invention, but merely to illustrate the true compactness and portability of the present machine, as contrasted with some of the much larger and bulkier scoring machines of the prior art.

Within the casing, in addition to various stationary frame members (not shown) there are parallel horizontal rails extending from front to rear, best shown in FIGS. 3 and 4. They include a pair of outside rails 51, just inside the lateral edges of the casing, and a central pair of rails 52 laterally separated from each other as shown, the top surfaces of all of these rails being substantially at the elevation of the top of the low portion 41 of the casing. A paper carriage 53, which may be referred to also as a paper tray or table, travels back and forth along the rails, from a position at the front of the machine, over the low part 41, to a rear position where all or most of the tray is within the high part 42 of the casing. The carriage is supported by small wheels 54 which travel on the upper surfaces of the outer pair of rails 51, and is guided to hold it against lateral displacement by wheels 55 riding on the inner vertical faces of the inner or central pair of rails 52, as clearly seen in FIG. 4. The wheels 55 (one pair near the front and one pair near the rear of the carriage) are mounted on vertical axles on brackets 56 fixed to the underface of the paper carriage.

One half of the carriage (for example, the left half) is adapted to receive an answer sheet which the teacher has marked with the correct answers, so as to constitute a key or master sheet for programming the electronic sensing or scanning mechanism. The other half of the carriage (for example, the right hand half) is adapted to receive either one or a plurality of answer sheets as handed in by the students, which are to be processed and scored. The present machine is designed to receive initially a considerable stack of answer sheets, up to about 100, and of course the height of the stack decreases as the top sheet is removed at the end of each processing cycle, until finally all of the sheets have been processed. But if the operator prefers not to place a stack of sheets on the carriage, there is no objection to having him place the answer sheets on the carriage one at a time, then removing the sheet when it has been scored and replacing it with another sheet to be scored. The key sheet or master sheet, on the contrary, remains on the paper carriage, in fixed position, until the scoring of all the answer sheets has been completed.

In FIGS. 3 and 4, the key sheet or master sheet is shown at 61, and the stack of answer sheets received from the students is shown at 62. The key sheet and the answer sheets to be processed are all on the same identical printed form, the difference being that the answer sheets 62 have been marked by the respective students, whereas the key sheet 61 has been marked by the teacher to designate the answers which he will accept as correct.

Preferably the flat top surface of the carriage 53 is provided with posts or other guides to insure correct positioning of the key sheet 61 and the answer sheets 62 on the carriage. These guides may take the form of upstanding members 63 engaging some or all of the corners of the respective sheets. Moreover, means may be provided for insuring that the sheets are correctly oriented and this may be done by cutting off one corner of each answer sheet (when the sheets are initially manufactured, before being supplied to the students) and by making the corner abutment 63, at that cut corner of the sheet, of a shape to fit closely against the cut corner. If any other corner than the correct corner of the sheet is attempted to be placed against this particular corner abutment, the sheet will not fit, thus indicating that it is not properly oriented.

The mechanism for moving the carriage or tray along the rails, rearwardly and forwardly again, is best shown in FIG. 5 in conjunction with FIG. 4. A small electric motor 71 slowly drives, by means of a gear reducer 72 and suitable bevel gears, a vertical shaft 73 carrying a sprocket 74 which drives a chain 75 running over a sprocket 76 at the lower end of another vertical shaft 77 rotatable in a bearing in a stationary bracket 78. At the upper end of the shaft 77 is another sprocket 79 which drives a chain 80 going over another sprocket 81 on a vertical idler shaft. Since the two sprockets 79 and 81 are of the same diameter, the two reaches of the chain 80 will be parallel to each other, and they are also parallel to the direction of travel of the carriage.

An upstanding pin 82 (FIGS. 4 and 5) on the chain 80 extends into a transverse slot 83 (FIG. 4) in the bracket 56 on the bottom of the carriage 53. As the chain travels, the pin 82 causes corresponding travel of the paper carriage. When the chain reaches a position where the pin 82 travels around one or the other of the sprockets 79 and 81, the pin slides along the slot 83, transversely of the direction of travel. When the pin 82 reaches its dead center position with respect to the forward sprocket 81, the paper carriage is at the extreme forward limit of its travel, which is the loading and unloading position. At this forward position, the bracket 56 or other suitable part of the carriage engages and opens a normally closed limit switch 84 which is in the circuit of the motor 71, thus stopping the motor and stopping the motion of the paper carriage in its forward or loading and unloading position. A pushbutton switch 85 in parallel with the limit switch may be pushed when it is desired to start the next cycle. As soon as the carriage has begun to move slightly rearwardly in response to the closing of the motor circuit by the pushbutton switch, the limit switch 84 closes again, and then the pressure on the pushbutton switch can be released. Alternatively, there may be an automatic timer 86 of conventional known kind, which may be used to restart the carriage motor after a brief interval. The three-position switch 87 may be shifted to a position to make the pushbutton switch 85 effective, or to make the timer 86 effective, or to a third position connected to a by-pass conductor 88 which short circuits the limit switch 84 and enables the motor to run continuously.

As the carriage moves rearwardly from its forward position, the motion carries the key sheet 61 beneath one set of sensing or scanning heads and the pile of answer sheets 62 beneath another set of sensing or scanning heads, both sets being mounted within the high part 42 of the casing. Since only a single key sheet 61 is used, there is no problem of variable height with respect to the key sheet, and so the scanning head for the key sheet can be mounted at a fixed height, slightly above the surface of the paper, sufficiently so that the illuminating lamp can properly illuminate the desired area which is to be scanned, without having any shadow cast by the scanning head on the area to be scanned. But a fixed height of mounting is not suitable for the sensing head which is to scan the answer sheets 62, because these sheets, at the time of scanning, may constitute a relatively thick stack or pile, or a thin stack, or perhaps only a single sheet. And the scanning head must be at a substantially uniform height above the sheet because each scanning photocell is provided with a lens which is focused on the sheet. Therefore, the sensing head for the answer sheets 62 is floatingly mounted at an elevation controlled by the thickness of the pile or stack of sheets, so arranged that it will always be at the desired slight elevation above the top sheet of the stack, the top sheet being the only one which is being scanned at the moment.

In addition to the matter of height above the sheet, another matter of importance with respect to the scanning heads is the matter of shifting them from one main column to the other main column of the key sheet or answer sheet, respectively. It will be recalled that in the preferred form of answer sheet (and key sheet) as above described, there are two main columns each containing spaces for marking the multiple choice answers to the particular questions in that column. In the preferred form of machine, the two scanning heads are arranged over one column of their respective sheets, for example the left hand column of each sheet, while the paper carriage is traveling rearwardly, and then at the rearward limit of motion of the carriage the heads are shifted over to the other column, and they scan the other column of the key sheet and answer sheet, respectively, during the forward travel of the paper carriage. Of course this shifting mechanism may be omitted if the answer sheet contains only a single column of answers (with various multiple choice positions within that column, on each answer line) but to do this would cut in half the number of questions which can be accommodated on a single answer sheet.

The mounting of the scanning heads, including the mechanism for shifting them from one column of the answer sheet to the other column, as well as the mechanism for controlling the height of the answer sheets scanning heads from the height of the pile or stack, will now be described with special reference to FIGS. 5–7. First as to the height feature, there is a rigid frame 91 of hollow rectangular shape, as seen in FIG. 7, the rear end of which is mounted by horizontal pivots 92 on fixed brackets 93 located near the rear portion of the high part 42 of the housing. The front end of the frame 91 is supported by two wheels 94, one near each front corner of the frame, which ride on the surface of the top sheet of the pile or stack of answer sheets 62 as the carriage moves the stack rearwardly and forwardly. Thus the front end of the rectangular frame 91 is at a variable elevation, depending upon the thickness of the stack of answer sheets on which it rides, although the rear end is maintained at a constant elevation by the pivots 92. Therefore, if the reading or sensing heads for the answer sheets are mounted at a predetermined elevation with respect to the front end of the frame 91, it is seen that they will remain at the desired elevation relative to the top sheet of the stack of answer sheets, regardless of the height of the stack within a reasonable limit or range.

The individual sensing or scanning units for scanning the multiple choice spaces of the key sheet 61 are schematically shown at 96 in FIG. 7, and are mounted in side-by-side relation on a mounting block 97. The sensing heads for scanning the multiple choices on the answer sheet are schematically shown at 98, and are mounted in side-by-side relation on the mounting block 99. If the answer sheet has only a single column of answers (with multiple choice spaces on each line) then no shifting from one column to another is necessary, and the mounting block 97 can be mounted in permanent fixed position in the housing, with the other mounting block 99 mounted in fixed position on the front edge of the rising and falling frame 91. But in the preferred form, with two columns of answer spaces, it is necessary to shift both groups of heads from one column to another, as already indicated. This is accomplished by supporting the blocks 97 and 99 on a shiftable linkage arrangement as shown in FIG. 7. Pivoted in the front and back cross members of the rectangular frame 91 are two shafts 101 and 102, extending front to back and parallel to each other. Close to their front ends, these shafts 101 and 102 carry upwardly extending cranks 103 and 104, respectively, and the upper ends of both cranks are pivoted to the rear face of the mounting block 99. Both cranks are parallel to each other, so that they act as a parallelogram linkage. The parts are so proportioned that when the shafts are turned to swing the cranks 103 and 104 leftwardly from their vertical positions, to their leftward limit of motion, the scanning heads 98 on the block 99 will be properly alined with the multiple choice spaces on the left hand half of the answer sheet. When the shafts 101 and 102 are turned clockwise (viewed from the front) to swing the cranks 103 and 104 to their limit of swing in a rightward direction, the mounting block 99 will be shifted slightly upwardly and then downwardly again to the same elevation as before, but in a position to the right of its former position, so that the sensing heads 98 will be properly alined with the multiple choice spaces on the right hand half of the answer sheet.

A similar linkage arrangement is provided for the mounting block 97 which carries the sensing heads which cooperate with the key sheet 61, but with the difference that the crank shafts for the block 97 are mounted in stationary bearings because the scanning heads 96 are always used at a constant elevation, so there is no need to mount the crank shafts in a rising and falling frame like the frame 91. One of the crank shafts for the block 97 is shown at 105, and it rotates in bearings in fixed frame members 106. The crank near the front end of this shaft is indicated at 107. The second shaft and second crank for supporting the mounting block 97 are not shown, but are essentially duplicates of the shaft 105 and crank 107. They serve to provide a parallelogram linkage for the mounting block 97.

The parallelogram linkage shafts are operated by the mechanism shown in FIGS. 5 and 6. The shafts 101 and 105 have upwardly extending cranks 108 and 109, respectively, near their rear ends, and these cranks are connected to each other to move in unison by a connecting rod or link 110. A second connecting rod or link 111 connects the crank 108 to the upper end of a two-armed lever 112 pivoted at 113 on a fixed bracket or frame part 114. The lower end of this same lever 112 is pivoted to one end of a link 115, the other end of which is pivoted at 116 to a small actuating lever 117 mounted to swing on a vertical pivot 118 near but slightly offset from the axis of the sprocket shaft 77, and located slightly below the lower sprocket 76 thereon. As shown in FIG. 6, the actuator 117 has an upstanding ear 119 at one end, and another upstanding ear 120 at the other end.

The chain 75 which runs from the sprocket 74 to the sprocket 76, has a downwardly extending pin 121 (FIG. 5). The parts are so proportioned that when one of the ears 119 and 120 is in the path of travel of the pin 121, the other ear will be out of such path of travel; and when the pin 121 engages one ear, it swings the actuator 117 from one limit position to the other limit position, putting the other ear in position to be engaged by the pin 121 the next time the pin comes around during the travel of the chain 75, at which time the pin will engage the second ear and swing the actuator back to its opposite limit position.

The chain 75, like the chain 80, makes one complete circuit of travel for each complete cycle of operation; that is, a backward motion plus a forward motion of the paper carriage. The pin 121 is so placed on the chain that it operates the actuator 117 at the completion of the backward stroke and beginning of the forward stroke of the paper carriage. At such time, the swinging of the actuator 117 by the pin 121, in one direction or the other, pushes or pulls (as the case may be) on the link 115, thereby acting through the lever 112 to push or pull on the links 110 and 111, to act on the cranks 109 and 108 to swing the parallelogram linkage shafts from one limit position to the other, thereby shifting both mounting blocks 97 and 99 of both groups of sensing heads from one columnar position to the other columnar position.

It does not matter in which columnar position the sensing heads were previously; they will always be shifted to the opposite columnar position when the paper carriage reaches the rear end of its stroke, and no shifting will occur when the carriage reaches the front end of its stroke. Thus it follows that during one cycle of operation, the left hand columns of the key sheet and the answer sheet will be sensed or scanned during the rearward stroke and the right hand columns during the forward stroke, then on the next cycle, the right hand columns will be scanned during the rearward stroke and the left hand columns during the forward stroke. This is permissible and without significance, because it makes absolutely no difference to the operation of the machine whether any particular column is scanned during a rearward stroke or a forward stroke, so long as the key sheet moves in the same direction and at the same time as the answer sheet being scanned, which of course is the case since both sheets travel together on the same paper carriage.

As above mentioned, the front end of the frame 91 rides on the top of the pile of answer sheets, during the scanning strokes or movements of the paper carriage. It is desirable, however, to raise the frame 91 when the paper carriage is at its forward limit of motion, to avoid any impediment to the smooth rearward travel of the paper carriage if the rear edge of the pile of answer papers happens to be forwardly of the sensing heads 98 and wheels 94 when the carriage is in its forward position (as will usually be the case) and also to avoid any frictional resistance to easy removal of the top sheet from the pile of answer sheets still to be processed, or easy insertion of a new pile to be processed, in case the scanning heads 98 overlie the answer sheet position at this time. The mechanism for raising the front end of the frame 91 and thereby raising the wheels 94 and scanning heads 98, is shown in FIG. 8, to which reference will now be made.

In addition to the upwardly extending pin 82 on the chain 80, which operates the paper carriage, there is also a downwardly extending pin 122 on this chain. It may be, in fact, a downward extension of the same pin 82. As the carriage closely approaches its forward limit of motion, the pin 122 engages one end of a horizontal lever 123 and swings this end forwardly or in a counterclockwise direction on its fixed vertical pivot 124. The opposite end of the lever is pivoted to a link 125 which is thereby pulled rearwardly. This link 125 has a long slot 126 in which is engaged a pin 127 on the first and approximately vertical arm 128 of a bellcrank lever pivoted on a fixed horizontal pivot 129. The other and approximately horizontally extending arm 130 of the bellcrank lever has a slot 131 engaging a pin 132 fixed to and extending laterally from one of the side arms of the pivoted frame 91 from which the sensing heads 98 are supported.

The parts are so proportioned that as the paper carriage closely approaches its forward limit of motion, and just before the rear edge of the stack of answer sheets would ride out from under the supporting wheels 94, the pin 122 shifts the lever 123 to pull the link 125 to operate the bellcrank 128, 130 so as to raise the front end of the frame, pivoting it upwardly on the pivots 92 at its rear end. The frame 91 remains in this slightly raised position so long as the paper carriage remains in its forward position, so there is no possible impediment to removal of the top sheet or all of the sheets from the stack of answer sheets, or to insertion of a new stack of answer sheets on the carriage. Shortly after the next rearward stroke of the paper carriage commences, and after the rearwardly advancing rear edge of the stack of answer sheets has reached a position below the supporting wheels 94, the pin 122 travels away from the lever 123, and gravity (assisted by springs, if desired) causes the front end of the frame 91 to drop down until the wheels 94 are riding on the surface of the top sheet of the pile of answer sheets.

The reason for having the pin 127 of the bellcrank lever engage in a slot 126 of the link 125, instead of having an ordinary pivotal connection between these members, is to allow for variations in the height of the pile of answer sheets. The slot is long enough so that the lever 123 may assume its normal rest position (uninfluenced by the pin 122) regardless of whether the frame 91 drops down to its lowest possible position, with only one sheet or no sheets on the paper tray, or whether it is held at a higher position by the presence of a stack of answer sheets of maximum height.

It has been mentioned that a very desirable although optional feature of the present invention, is the provision of means for marking the correct answer on the student's answer sheet for each question which the student did not answer correctly. The mechanical mounting and actuating parts will now be described with reference to FIGS. 9–13, although the explanation of the electronic circuits for actuating the marking means will be deferred until later.

Referring first to FIG. 9, there is shown in perspective some details of the parts of the sensing or scanning head shown schematically at 98 in FIG. 7, this scanning head being also the marking head for marking the correct answers. It will be noted that in FIG. 7 the schematic illustration shows five vertically elongated blocks or units, this being because, in the preferred form, the questions have five multiple-choice answers, or at least a maximum of five choices, although less can be used for any particular question. At any rate, the number of units in the sensing and marking head is the same as the maximum number of choices for which the machine is designed, and can be greater or less than five if desired.

The perspective view, FIG. 9, shows that each unit has a narrow compartment 141 formed between a first vertical partition of flange 142 and a second veritcal partition or flange 143, and then a wider space or compartment 144 between the second partition 143 and the next partition 145, which may constitute the first partition or flange 142 of the next adjacent unit. When the head is in normal operating position, the narrow compartments 141 are centered directly over the centers of the respective small rectangles representing the different multiple choices for the answers to a particular question, the locations of such rectangles being clear from a study of FIG. 2 and the foregoing description thereof. The wider compartments 144 are centered directly over the lateral spaces between the multiple choice marking rectangles, so that they will be directly over the letters of the alphabet which are placed between the rectangles to indicate the separate rectangles. The leftmost one of the compartments 144 will be centered over the theoretical space to the left of the leftmost rectangle, in other words, centered over the letter A.

Each of the narrow compartments 141 is open at its bottom, so that light reflected upwardly from the marking rectangle immediately below it can pass upwardly into the narrow compartment, through a lens as further described below, the image of any mark in the rectangle being thereby focused upon a miniature photocell mounted in that compartment, there being a separate photocell in each of the narrow compartments 141. Each of the wide compartments 144 contains a marking tool, and in order to mount such tool, the lower end of each wide compartment 144 is closed by a bottom wall 146 having a hole 147 formed centrally therein. Standing vertically in each of the wide compartments 144 is a suitable marking tool such as a known commercial form of crayon pencil, indicated in general at 150 (FIG. 11) and containing an adjustably mounted soft crayon which will make a mark on paper as a result of exertion of very light pressure, without requiring any heavy pressure against the paper. In such crayon pencils as commercially available on the open market, the crayon or lead can be adjustably fed downwardly by turning a knob 151 at the top of the body, to compensate for wear due to usage. If desired, a commercially available form of ink pen may be used instead of a crayon pencil.

In order to keep the lead of the marking tool upwardly away from the paper except when a mark is purposely to be made, the lower end of the tool is surrounded by a light coil spring 152, supported from and reacting downwardly against the bottom wall 146 of the compartment, and reacting upwardly against a collar 153 slipped over the tapered lower portion of the tool 150, the size of the hole in the collar 153 being such with relation to the taper of the tool that it cannot rise higher than a predetermined point on the tool, at which point the upward force of the spring 152 is just sufficient to hold the tool slightly elevated from the paper as shown in FIG. 11.

The entire tool 150 moves bodily downwardly against the force of the spring 152, when it is desired to have the tool make a mark on the answer sheet. To do this, a small actuating solenoid 154 is mounted on the back of the mounting block 99 as seen in FIG. 10, there being a separate solenoid for each marking tool. The solenoid is placed vertically, and energization of the solenoid pulls downwardly on a rod 155 which extends vertically upwardly through a slot 156 in a lower leaf spring 157 and through another slot 158 in an upper leaf spring 159, the upper end of the rod 155 having a crossbar or T 160 which overlies the upper leaf spring 159. The two leaf springs are linked to each other at corresponding ends by a piano hinge 161 or similar linkage. The opposite end of the lower leaf spring 157 rests on the top edge of the mounting block 99 as shown in FIG. 10, while the other end of the upper spring 159 is forked to engage around the knob 151 at the top of the marking tool and rests on a cushion spring 162 which surrounds the knob or stem 151.

With this arrangement, when the solenoid 154 is energized (through electrical circuits described below) it will pull downwardly on the rod 155, so that the T head 160 thereon will pull downwardly on the upper leaf spring 159, producing downward force on the cushion spring 162 sufficient to overcome the upward force of the lower spring 152. This will depress the entire body of the marking tool 150 slightly downwardly, causing the exposed lower end of the crayon or lead to engage the paper. The energization of the solenoid 154 and the downward position of the marking tool will last for only a moment, but it will be recalled that the paper carriage is in continuous movement at this time, so the lead or crayon of the marking tool will "drag" on the paper momentarily and make a mark, not through the multiple choice marking rectangle of the answer sheet, but rather through the letter of the alphabet which is to the left of the proper rectangle, indicating or referring to that rectangle. As will be apparent from the description of the electrical circuitry, the solenoid of the marking tool in the proper position to indicate the correct answer will be actuated or energized when the student has not marked the correct answer, and the mark thus made on the paper will indicate to the student, when his paper is handed back to him, what the correct answer should have been.

The arrangement of the leaf springs 157 and 159, in combination with the cushion spring 162, gives enough resiliency to insure that the marking tool is moved downwardly with sufficient force to make a mark, but not such force as would be likely to break the lead or crayon, even when the crayon has been adjusted to be a little longer or a little shorter than its optimum length, or when it has become shorter by wearing down.

The above described mounting of the marking tool enables the tool to be easily adjusted, and also easily removed and replaced when necessary. The marking tool 150 simply rests vertically in its compartment 144 of the scanning and marking head, and is not held by any screws or similar fasteners that would need to be removed. To prevent the various marking tools in the scanning head from accidentally tilting forwardly and falling out of their respective compartments, the fronts of the respective marking compartments may be closed by a cover plate. Also, the fronts of the narrow or photocell compartments should be closed, to prevent extraneous light from reaching the photocells. A separate cover plate may be used for the front of each compartment (or for each set of two compartments, one wide and one narrow) if desired, but it is usually preferred to use a single wide cover plate extending across the front of each scanning head, that is, one cover plate across the front of the scanning head 98 and another one across the front of the scanning head 97. Preferably each cover plate is resiliently held in place by spring action and therefore easily removed, for ease of adjustment or replacement of the photocells or the marking tools. For example, the cover plate may be constructed as shown in FIG. 10, with a front wall 165 which closes the fronts of the various compartments, and a top flange 166 which hooks over the top of the mounting block 99 or 97, as the case may be, at one or two points, and a resilient bottom flange 167 which extends rearwardly and resiliently hooks over one or more small bumps or protuberances 168 on some or all of the bottom walls 146 of the wide compartments. Of course the bottom flange 167 has windows or openings at the proper places for passage of light upwardly into the narrow compartments, to activate the photocells therein, and openings through which the marking tools may extend.

The sensing or scanning head 96 used on the key sheet 61 may be similar in construction to the sensing head 98 used on the answer sheets, except that the marking tools and the actuating mechanism for the marking tools are completely omitted. The same narrow compartments are used, however, to line up with the multiple choice spaces on the key sheet, and they contain sensing or scanning photocells.

*Electronic circuits*

The electronic components and circuitry for performing the above mentioned functions and others which will appear hereinafter, will now be described with reference to FIGS. 14–23 of the drawings. The electronic parts of the machine may be collectively referred to as the "logic" system. This part of the description presupposes that the reader is skilled in the art of electronics, and more particularly the art of computer electronics, so that the description need not point out in detail what will be obvious, either from what is described or what is shown in the various wiring diagrams. Power supplies and various other features and details commonly understood by those skilled in electronics need not be either illustrated or described, and it is thought that parts which are sufficiently understandable from the conventional symbolism of the wiring diagrams need not be particularly mentioned.

Figure 14:
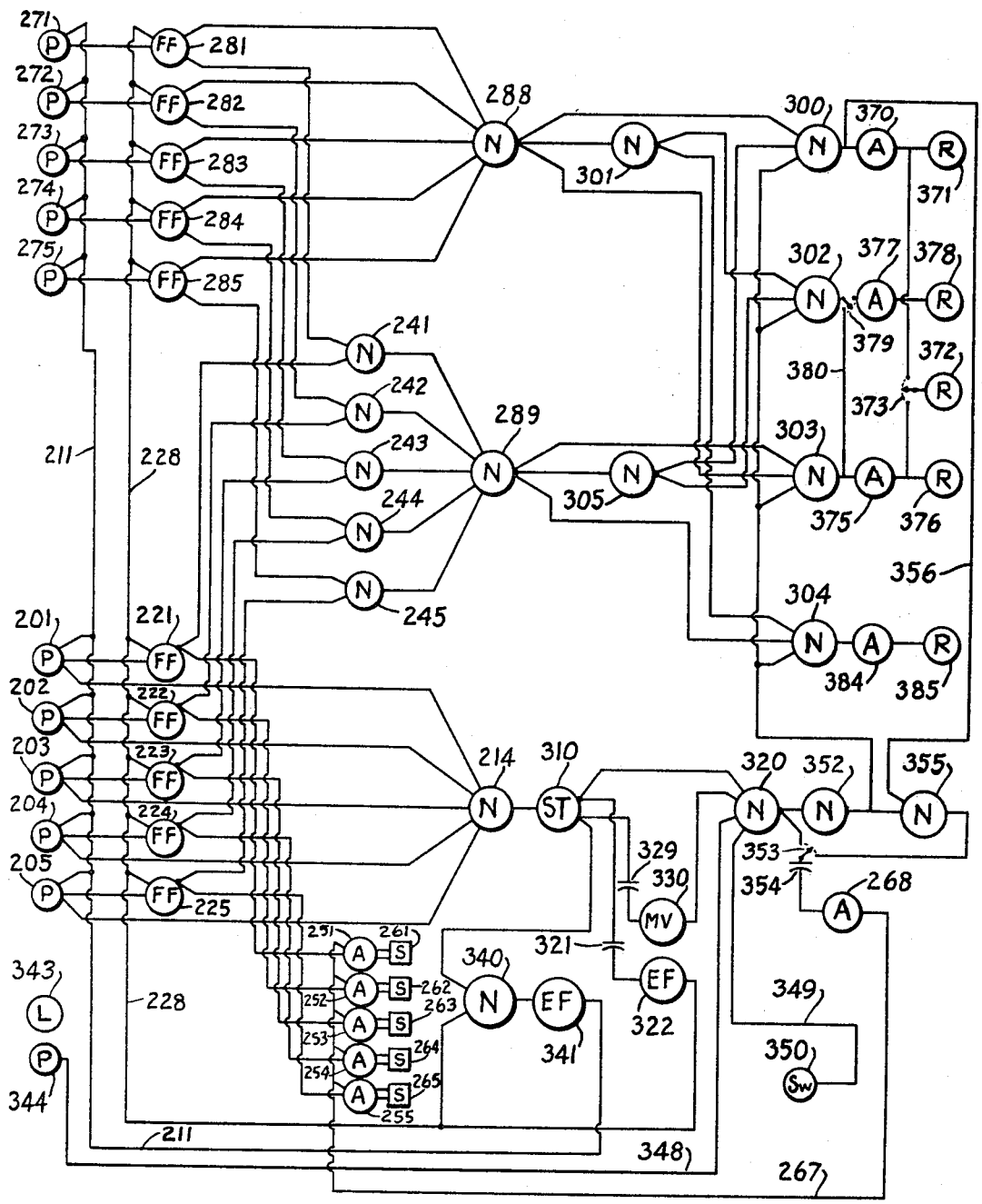
FIG. 14 is a schematic wiring diagram, partly in "block" form, showing the main parts of the electronic circuitry for sensing or reading the students' answer sheets in comparison to the key or master sheet and discriminating between correct answers and those which are not correct, and operating the appropriate registers and marking tools.

Referring now to FIG. 14, the various circles represent various components, most of which are known per se in the electronics art and really require no further description other than naming the component or describing its function. However, typical forms of construction of some of the components are indicated in FIGS. 15–23.

In FIG. 14, each of the circles 201 through 205 indicates schematically a photocell component or unit for sensing or scanning one of the multiple choice spaces on the key sheet or master sheet. These units 201 through 205 collectively constitute the key sheet scanning head partially shown at 96 in FIG. 7. Each of these photocell units may be of the construction indicated in FIG. 15.

Each of these units includes a photocell 206, powered through conductor 207 connected to a suitable direct current supply, for example at a potential of −12 volts. Of course this direct current potential may be derived from an alternating current rectified so as to be well smoothed and regulated to be within a tolerance of not more than plus or minus 2 percent. In connection with the current supplies for the photocells as well as for the other elements or components, it is desired to emphasize that, as well understood in the electronics art, electronic components can be designed to operate at any desired potentials. Therefore it is to be understood that in each case a suitable potential is used, appropriate to the particular component or circuit supplied thereby. In the following description of the electronic circuitry, there will be frequent mention of 12 volt supplies, but it must be clearly understood that this is merely for convenience of description and for the sake of giving a specific example, the particular voltage mentioned being not intended as a limitation and being not an essential part of the invention.

Figure 24:
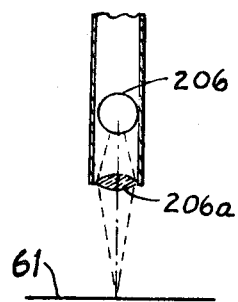
FIG. 24 is a diagram of a light sensor and associated parts, useful in reading the marks on the answer sheet or key sheet.

The photocell 206 itself is any suitable commercially available photocell, such as, for example, a cadmium selenium glass photocell identified by the name "Clairex" photocell, which is commercially available; or, as another example, an N-P-N Planar Silicon Photo Device or Light-Sensor, Type LS–400, commercially available from Texas Instruments Incorporated, of Dallas, Texas. Whichever model or form of photocell is used, it is used in conjunction with a lens 206a (FIG. 24) which focuses the image of the mark on the paper sheet onto the photoconductive portion of the photocell. The lens is shown schematically in FIG. 24, and it may be a separate element or, preferably, forms the window at the lower end of the housing of the photocell unit, this being the construction of the above mentioned type LS–400 unit. In any event, the photocell unit, and its lens (if separate) are mounted in the appropriate one of the narrow components 143 (FIG. 9) in the key reading head 96 (FIG. 7). The output of the photocell goes to the amplifier unit shown schematically in FIG. 15, each circle 201 through 205 in FIG. 14 being intended to signify the complete component including the transistor amplifier as well as the photocell itself.

The amplifier portion of each of these units will be sufficiently understood by those skilled in the art, merely from the wiring diagram shown in FIG. 15, and it is seen that one terminal 208 is connected to a −12 volt supply and another terminal 209 is connected to a 0 potential supply, or grounded. There are three outputs, one output conductor 210 (FIG. 15) going through a rectifier as indicated to the "hold" conductor 211 (FIG. 14) which is common to all of the key reading photocell units 201–205 and to the answer sheet reading photocell units which will be described below. The function and connections of the "hold" circuit conductor 211 will also be further described below. The second output circuit conductor from each photocell amplifier unit is indicated at 213 and goes to an input of a NOR gating circuit unit or component 214 (FIG. 14) receiving input from all five of the photocell amplifier units 201–205. The third output circuit conductor 216 (FIG. 15) from each photocell amplifier unit goes to its own individual flip-flop unit or component as shown in FIG. 14, there being a separate flip-flop unit for each of the photocell amplifier units 201–205, the respective flip-flop units being indicated at 221–225, respectively. The notation FF marked on each of these units 221–225 in FIG. 14 is to indicate them as flip-flop units for ease of quickly following the main wiring diagram.

The flip-flop units or components 221–225 may be of a conventional form known per se in the art, one suitable form being schematically shown in FIG. 21. As shown in this figure, the flip-flop unit has an input conductor 226, which is the conductor coming from its associated individual photocell amplifier unit. It also has another input conductor 227 connected to a reset conductor 228 (FIG. 14) which is common to all of the flip-flop units and which functions as further described below. It also has a connection 229 to a +12 volt supply, and a connection 230 to a −12 volt supply, preferably highly smoothed and stable like the above described supply for the photocell conductor 207 in FIG. 15. In fact, the supply for the conductors 207 and 230 may come from the same source. The flip-flop component also has a connection 231 to 0 potential, or grounded, and has two output conductors 232 and 233.

One of the output conductors from each of the flip-flop units goes to its own individual gating component indicated schematically at 241 through 245, respectively, there being one of these gating components for each flip-flop unit 221 through 225, respectively. These gating components 241–245 receive inputs not only from the flip-flop units 221–225 but also from another set of flip-flop units, as will be further described below.

The second output conductor from each flip-flop unit 221–225 goes to the input of its individual amplifier unit indicated schematically at 251 through 255, respectively. These amplifier units 251–255 furnish power for operating the solenoids 154 (FIG. 10) which actuate the marking tools 150 (FIG. 11) to mark the correct answer on the student's answer sheet when he has given an incorrect answer; hence these amplifiers may be called solenoid amplifiers, if desired, to distinguish them from various other amplifiers used in other locations in the circuit.

Each of the amplifiers 251–255 may be of the same construction, which may be any suitable transistor amplifier known in the art. A typical known form of such amplifier is shown schematically in FIG. 19, from which the construction will be readily understood by those skilled in the art, without further detailed description. It is sufficient to say (referring to FIG. 19) that the amplifier unit has an input conductor 256 which is the conductor coming from the output of the particular individual one of the flip-flop units 221–225 to which the amplifier under discussion is connected. The amplifier also has a connection 257 to a −12 volt supply, another connection 258 to another −12 volt supply which is decoupled from the first mentioned −12 volt supply, and a connection 259 to a +12 volt supply. The output of the amplifier is connected to the load by a pair of circuit wires collectively indicated at 260. In the present instance, the loads of these amplifiers are the respective marking tool actuating solenoids, one of which is shown in FIG. 10 at 154, the series of solenoids being indicated in FIG. 14 at 261 through 265, respectively, one solenoid for each individual amplifier unit 251 through 255. Since there is such an amplifier unit for each individual flip-flop unit 221–225, and a separate flip-flop unit in turn for each key sheet sensing or scanning photocell unit 201–205, it follows that there is one solenoid 261–265 operatively connected to each individual photocell unit 201–205 respectively.

17

In addition to the above described connections 256–260 of each amplifier unit, the amplifier unit also has another connection 266 which, as shown, goes to the emitter of the second transistor. The connections 266 of all of the amplifier units 251–255 are connected to a common conductor 267 (FIG. 14) which goes to the output of another amplifier 268, the purpose and function of which will be further described below.

Referring now to the upper left portion of FIG. 14, there is a second series of photocell and amplifier units for sensing or scanning the marks made by the student on the test paper or answer paper, five of such units being indicated by the circles 271 through 275, inclusive. This is on the assumption that there are not more than five choices in answering each question. Of course the machine can be constructed to accommodate any desired number of choices, by increasing the number of the photocell units 271–275 and correspondingly increasing the number of the scanning units 201–205 for reading the key or master sheet, and increasing the other elements and circuits correspondingly.

Each of the photocell and amplifier units 271–275, or at least the photocell portion thereof (together with the lens, if it is separate from the photocell housing) is mounted in its appropriate narrow compartment 141 (FIG. 9) of the answer sheet reading head 98 (FIG. 7) in the same way that the photocells in the units 201–205 were mounted in the key or master reading head 96. In addition, the wide compartments 144 in the reading head 98 contain the marking implements 150, as already explained in connection with FIGS. 9–13, operated by their respective solenoids 261–265, seen schematically in FIG. 14, each of which corresponds to the solenoid 154 in FIG. 10.

The sensing or scanning units 271–275 for the answer sheet or test sheet are similar in general to the units 201–205 for the key sheet or master sheet, but are different in some respects, the construction of these units being more particularly shown in FIG. 16. The differences can be seen by comparing FIG. 16, illustrating the details of the units 271–275, with FIG. 15, illustrating the details of the units 201–205. The answer reading units in FIG. 16 each have a photocell 276 which may be identical with the previously described photocells 206, connected by the conductor 277 to a −12 volt supply, well smoothed similar to the supply for the conductor 207 of the photocell 206. At another point, the amplifier network associated with the photocell is connected at 278 to another −12 volt supply. The connection 279 leads to a 0 potential supply, or is grounded. The connection 280 goes to the "hold" circuit conductor 211, which is the same conductor which is connected to the connections 210 of the photocell units illustrated in FIG. 15. The second output conductor of the unit in FIG. 16 is indicated at 286, and goes to its own individual flip-flop unit 281 through 285, respectively. These flip-flop units 281–285 may be identical in construction with the other series of flip-flop units 221–225 associated with the respective photocell units 201–205.

It will be noted that whereas the photocell units 201–205 have three output circuits, the photocell units 271–275 have only two output circuits, one going to its associated flip-flop unit and the other going to the "hold" conductor 211.

Each of the flip-flop units 281–285 has two output circuits illustrated at 232 and 233 in FIG. 21, as mentioned in the previous description of this figure. One of the output circuits leads to an input of a NOR gating circuit unit or component 288, the circuit from all five of the flip-flop units 281–285 going into this same gating unit 288. The other output conductor from each flip-flop unit 281–285 goes to an input connection of its own individual gating component 241 through 245. These are the same components 241–245 which also receive output from the flip-flop units 221–225, respectively. In other words, as plainly seen from the wiring diagram, each individual gating component 241–245 receives input from one flip-flop unit in the group 221–225 and also from one flip-flop unit in the group 281–285, as will be readily apparent from the wiring diagram, FIG. 14.

There is another NOR gating unit 289, similar to the unit 288, which has a fan-in connected to the output circuits of all five of the NOR units 241–245. All of the NOR units 214 and 241–245 and 288 and 289 may be of identical construction except that each of the units 241–245 has only a two-circuit fan-in, whereas the units 214, 288, and 289 each have a five-circuit fan-in. The construction of each of these gating circuits is conventional and known per se, and may be varied within the skill of the art. A typical construction thereof is illustrated in the wiring diagram, FIG. 18, where it is seen that the fan-in (regardless of whether it is only two fan-in circuits or five fan-in circuits) is connected through a conductor 290 to the base of the transistor. The base is also connected through a resistor to a +12 volt supply 291. The emitter of the transistor is connected at 292 to 0 potential or grounded, and the collector of the transistor is connected to the output circuit 293 and also has a branch going through a resistor to a connection 294 to a −12 volt supply. Any desired number of fan-out or output circuits can be connected at 293, within the capabilities of the circuit.

As seen near the upper part of FIG. 14, the NOR gating unit 288 has a three-circuit fan-out, one circuit going to the NOR gating unit 300 which may be conveniently referred to as the correct answer unit. A second fan-out circuit from the unit 288 goes to another similar NOR gating unit 301, one fan-out of which goes to still another similar NOR gating unit 302 which may be referred to as the unanswered unit. The third fan-out from the unit 288 goes to still another similar NOR gating unit 303 which may be referred to as the wrong answer unit. As above mentioned, one fan-out from the intermediate unit 301 goes to the unanswered unit 302, while a second fan-out circuit from the unit 301 goes to still another NOR gating unit 304 which may be referred to as the panic unit.

The NOR gating unit or component 289 also has a three-circuit fan-out, one conductor of which goes to the fan-in of the unit 303, another of which goes to the fan-in of the unit 304, and the third fan-out conductor from the unit 289 goes to the input of another intermediate NOR gating circuit or unit 305. The unit 305 has two fan-out circuits, one going to the correct answer unit 300, the other going to the unanswered unit 302.

Referring now to the lower right portion of FIG. 14, the output of the NOR circuit unit 214 (which receives input from the key sheet or master sheet reading photocell units 201–205) goes to the input of a Schmitt trigger circuit or unit 310. A Schmitt trigger circuit is well understood in the electronic art, and this one may be of any known form, the form shown in FIG. 22 being a typical form suitable for present purposes. The input circuit 311 in FIG. 22 comes from the output of the NOR unit 214, as above mentioned. The Schmitt trigger unit has a connection 312 leading to a +12 volt supply, and a connection 313 leading to a −12 volt supply which is well smoothed or regulated to within plus or minus 2%. Another connection 314 goes to zero potential or is grounded. There are two output leads or conductors 315 and 316. The conductor 315 is connected to an input of a NOR gating circuit unit 320, and is also connected, through a capacitor 321, to the input of an emitter-follower unit 322. The schematic representation of the unit 322 in FIG. 14 is marked EF to assist the reader in quickly identifying this as an emitter-follower unit, when tracing the circuits in FIG. 14, and for the same purpose the schematic representation of the Schmitt trigger unit 310 is marked ST, while the various NOR gating circuit units are marked N.

Emitter-follower units or circuits are well known in the art. A typical form is shown in FIG. 20, where it is seen that the input connection 323 (in this instance coming from the capacitor 321) goes to the base of the transistor. The collector of the transistor is connected as at 324 to a −12 volt supply, while the emitter of the transistor is connected at 325 to the output circuit. In the present instances, the output of the emitter-follower unit 322 is connected to the previously mentioned reset circuit conductor 228.

As above explained, one of the output conductors 315 from the Schmitt trigger unit 310 goes to the unit 320, and also to the capacitor 321. The other output connection 316 from the unit 310 likewise is branched or forked, and one branch thereof goes through the capacitor 329 to the input of the one-shot multivibrator circuit or unit 330, the output of which goes to an input of the previously mentioned NOR unit 320. The schematic representation of the unit 330 is marked in FIG. 14 with the letters MV, for ease of quick identification. One-shot multivibrator circuits are known in the art, and any suitable form thereof may be used in the present instance. A typical form suitable for present purposes is shown in FIG. 23, where the input connection is indicated at 331. There is also a connection 332 going to a +12 volt supply, another connection 333 to a −12 volt supply which is well smoothed or regulated to a variation of not more than 2%, and another connection 334 going to zero potential or grounded. The output connection is indicated in FIG. 23 at 335, and as above explained it goes, in this instance, to the fan-in of the NOR circuit 320.

The other branch or fork of the output conductor from the unit 310 goes to the fan-in of the NOR gating circuit, unit 340, and this fan-in is also connected, as shown, to the reset conductor 228 which, it will be recalled, is powered from the output of the emitter-follower unit 322.

The output of the NOR unit 340 goes to the input of an emitter-follower unit 241, which may be of the same construction as the emitter-follower unit 322 previously described, both having the circuitry illustrated in FIG. 20. The output of the emitter-follower unit 341 is connected to the "hold" conductor 211 which, as previously explained, is connected to the sensing or reading photocell units 201–205 and 271–275.

Within the machine casing, and located fairly close to the respective sensing or scanning heads 96 and 98, there are one or more illuminating lamps of conventional kind, for illuminating the surface of the key or master sheet and of the student's answer sheet. Preferably only a single lamp is used, of tubular form, extending across the front of the machine just inside the casing, and shown schematically at 343 in FIG. 14. To make sure that this illuminating lamp is working properly and to avoid malfunction of the machine which would occur if the illuminating lamp burned out, there is what may be called a lamp photocell or light photocell unit 344 located in a position to receive light from the above mentioned illuminating lamp, and shielded so as to receive no light from any other source except the illuminating lamp. Therefore, when the illuminating lamp 343 is lit, the photocell unit 344 will be activated, so that the rest of the machine can function; but when the illuminating lamp 343 is not lit, the unit 344 will be dark so that it will not be activated, and the rest of the machine cannot function. This photocell unit may be of a somewhat simpler construction than that of the key sensing photocell units (FIG. 15) or of the answer sensing photocell units (FIG. 16) and may be of a relatively simple construction indicated in FIG. 17. Here, the photocell itself is indicated at 345 and may be of the same type and construction as the photocells 206 and 276. One connection 346 goes to a +12 volt supply, another connection 347 goes to a −12 volt supply, and the output connection 348 goes to an input of the NOR gating circuit 320.

It will be recalled from the previous description that the NOR unit 320 receives input or fan-in from the output of the Schmitt trigger unit 310, and from the output of the one-shot multivibrator unit 330, as well as from the output of the light photocell unit 344. In addition, the NOR unit 320 receives input or fan-in also from a conductor 349 leading from a switch unit schematically shown at 350. This switch unit has two switches arranged in parallel with each other, one closed by the tray 53 when the tray reaches one end of its travel, and the other closed by the tray when it reaches the other end of its travel. Thus when the tray is at either end of its travel, the switch unit 350 provides input to the NOR unit 320 and this input stops the output of the sensing or scanning mechanism, as will be further described below.

Returning now to the NOR unit 320, the output or fan-out of this unit has two branches, one going to the input of another NOR gating circuit unit 352, the other going either direct or, preferably, through a two-way switch 353 to a capacitor 354 and then, from the opposite side of the capacitor, to the input of the previously mentioned amplifier 268, which, it will be recalled, is connected through the conductor 267 to the solenoid amplifiers 251–255 which power the respective solenoids 261–265 for operating the marking implements to mark the correct answer. The output of the NOR unit 352 goes to the input or fan-in of all four of the NOR units 300 (correct answer), 302 (unanswered), 303 (wrong answer), and 304 (panic). In addition, output from the NOR unit 352 may also go to the input of a further NOR unit 355, which receives input also, through the circuit or conductor 356 from the output of the "correct answer" NOR unit 300. The output of the unit 355 goes to the previously mentioned two-way switch 353, which may be shifted to one position or the other, connecting the capacitor 354 (and the unit 268) either to the output of the NOR unit 320, or to the output of the NOR unit 355, but not to both.

When the switch 353 is positioned to connect the capacitor 354 and amplifier 268 to the output of the NOR unit 320, then the solenoids 261–265 will be operated to mark the correct answer on the answer sheet in each case, regardless of whether the student has or has not answered the question correctly. On the other hand, when the switch 353 is positioned to connect the capacitor 354 and amplifier 268 to the output of the NOR unit 355 rather than that of the unit 320, then the solenoids 261–265 will be operated to mark the correct answer only if the student has not marked the correct answer. If it is desired to have the correct answer shown on the answer sheet in every case, whether or not the student has marked it correctly, then the NOR unit 355 can be completely eliminated and the switch 353 can also be eliminated, making a permanent connection from the output of the unit 320 to the capacitor 354.

Referring now to the upper right hand portion of FIG. 14, the output of the correct answer NOR unit 300 goes to the input of an amplifier unit 370, and the output of the amplifier unit 370 goes to any conventional form of electro-magnetic register 371, such registers being readily available on the commercial market. Thus when the student has answered correctly, the NOR gating circuit 300 will be activated to activate the amplifier 370 which will operate the register 371 which counts the correct answers of this particular student's answer sheet. The register 371 is preferably of the resetting type, and is reset to zero at the conclusion of scoring each student's answer sheet. It may be simply a counting register (such registers being well known in the art) or it may be a recording register or so-called printout register, which will print the total just before it is reset to zero, either directly on the student's answer sheet or on a separate piece of paper which may later be affixed to the answer sheet. Registers of the print-out type are well known in the art and commercially available. In addition to operating the register 371, which counts (and prints if desired) the total number of correct answers on the answer sheet of the individual student, the amplifier 370 may also operate another register 372 which counts a cumulative total of all of the correct answers from an entire group of papers, such as the papers handed in by the students in a single class. This register 372 is not reset to zero at the end of scoring each individual paper, but rather is reset to zero by a manual reset button 372a (FIG. 1), when the operator of the machine has scored the entire group of answer sheets, thus enabling easy compilation of data for class averages. Such electromagnetic registers, manually reset, are well known in the art and commercially available. At times it may be desired to have this register count the wrong answers rather than the right answers. Therefore, preferably, the conductor from the amplifier 370 to the cumulative register 372 goes through a two-way switch 373 which may be operated to connect the register 372 either to the output of the correct answer amplifier 370, or to the output of the wrong answer amplifier as further mentioned below, in case the operator of the mechanism prefers to obtain a cumulative total of wrong answers rather than a cumulative total of correct answers.

The "wrong answer" NOR unit 303 has its output going to an amplifier unit 375 which operates the electromagnetic register 376. Like the register 371, this register 376 may be simply a counting register, or may be a recording or print-out register. In either case, it counts the wrong answers on one particular answer sheet, and then is reset to zero, preferably automatically in known manner, ready for counting the wrong answers on the next answer sheet.

The output of the amplifier 375 preferably goes not only to the register 376, but also to the switch 373 which is associated with the cumulative register 372. Sometimes the operator wishes to count the cumulative total of wrong answers in the entire group of answer sheets, rather than the cumulative total of right answers. By shifting the switch 373, the register 372 may be made to count either wrong answers or right answers, as desired from time to time.

In some cases, the student may not mark any answer whatever to a certain question. As already mentioned, the NOR gating circuit or unit 302 is the one which is activated when no answer has been marked for the particular question which is being sensed or scanned. In some cases, particularly when the most complete and versatile form of mechanism is desired, the output of the NOR unit 302 activates an amplifier 377 similar to the amplifiers 370 and 375, and this amplifier 377 in turn actuates an electromagnetic register 378 similar to the registers 371 and 376. This register 378 will count the unanswered questions on each individual student's answer sheet.

Many teachers prefer to regard unanswered questions as wrong answers, and the present mechanism can score the answers in this way, if desired. Instead of having the output of the NOR unit 302 go directly and permanently to the amplifier 377, it preferably goes through a two-way switch 379 which, in one position, directs the output of the unit 302 to the amplifier 377, and in another position directs the output of the unit 302 to the circuit conductor 380 which leads to the amplifier 375 which is the amplifier for wrong answers. When the switch is in this position, the amplifier 375 is activated by the "unanswered" NOR unit 302 as well as by the "wrong" NOR unit 303, so that unanswered questions are counted as wrong answers. In an economy model of the machine, to reduce expense, the switch 379 can be omitted and the circuit conductor 380 can be connected permanently to the output of the NOR unit 302, the amplifier 377 and the register 378 being entirely omitted. Thus in all cases, lack of any answer to a particular question will be counted as a wrong answer, and this is sufficient for most purposes. However, if the teacher wishes a separate count of unanswered questions, then the switch 379 and the parts 377 and 378 are included in the machine.

The so-called "panic" NOR gating circuit or unit 304 has its output going to an amplifier 384 which actuates a locking relay 385 of a conventional kind available on the market, and having a manual reset. This relay 385 controls an alarm buzzer or a flashing red light, or other suitable signal, and may also control the supply of current to the electronic circuitry or other desired part of the machine. When the "panic" circuitry including the NOR unit 304 is activated, this indicates that there is a malfunction somewhere in the machine, and it actuates the amplifier 384 and the locking relay 385 to activate the above mentioned signal and possibly shut down part of the machine. The panic alarm system is de-activated when the relay is manually reset, which may be done after the malfunction has been corrected, or may be done for test or investigation purposes to locate the point of failure.

The amplifiers 268, 370, 375, 377, and 384 may all be of the same construction, and essentially the same as shown in FIG. 19 and described in connection with the solenoid amplifiers 251–255. The difference is that in the solenoid amplifiers 251–255, the connection 266 (FIG. 19) to the emitter of the second transistor is connected to the conductor 267 which comes from the load terminal of the amplifier 268. In the other amplifiers 268, 370, 375, 377, and 384, on the other hand, the connection 266 from the emitter of the second transistor is connected to zero potential or grounded.

Returning for a moment to the registers for counting the answers, it is pointed out that in some cases the teacher or other operator of the machine may not care to total the correct answers and wrong answers separately, but may be content to total one or the other rather than both. It has already been mentioned that the economy model of the machine may omit the amplifier 377 and the register 378, permanently tying the amplifier 375 to the NOR unit 302 as well as the NOR unit 303, to count unanswered questions as wrong answers. Carrying the economy idea one step further, it is possible to eliminate the two separate registers 371 and 376 for registering correct and wrong answers, and use only a single register 392 (FIG. 1) for this purpose, with a single switch 393 to connect such register operatively either to the correct answer circuit or the wrong answer circuit, at will. In other words, the register for registering the correct or incorrect answers (as the case may be) on an individual answer sheet, would be hooked up in the same way as the cumulative total register 372, with a switch 373 operable to connect it to the correct circuit or the incorrect circuit. Such register, like the registers 371 and 376 previously described, may be a simple counting register, or a recording or print-out regitser. Such register would be reset to zero after scoring each individual answer sheet, whereas the register 372 would be reset only after completion of scoring the entire group of answer sheets.

*Operation*

The operation of the mechanism may be briefly described as follows. The key sheet or master sheet, marked by the teacher to show what answers will be accepted as correct (possibly more than one answer for a particular question) is placed on the left hand side of the paper carriage or tray 53, in the position shown at 61 in FIG. 3. A single answer sheet marked by the student, or preferably a pile or stack of such answer sheets, is placed on the right hand side of the same carriage 53, in the position shown at 62. After the main power supply is turned on by a suitable switch, the individual cycle for scoring one particular answer sheet is started by pressing the start button shown in FIG. 1. This starts the motor 71 to move the paper carriage 53 through the rearward stroke of its cycle, so that the successive lines of questions on both the key sheet 61 and the student's answer sheet 62 successively pass under the key reading head 96 and the answer reading head 98, whereby the reading heads sense or scan the marks on the key sheet and the answer sheet, respectively, and compare one with the other through the electronic circuitry, the operation of which will be described in a moment. At the completion of the rearward stroke, the mechanism already described in connection with FIGS. 5–7 flips both the key reading head 96 and the answer reading head 98 over to their other positions, so that if they read the respective left hand columns while the paper carriage was moving inwardly, they will read the right hand columns as the paper carriage moves forwardly or outwardly, or vice versa, as it makes no difference in which order the columns are read. So the carriage then moves forwardly to complete its cycle, and the respective reading heads again sense or scan the marks on the second main column of each sheet, comparing one with the other. The machine temporarily comes to rest at the completion of the forward stroke of the paper carriage, giving the operator an opportunity to remove the top sheet from the stack of answer sheets. The operator then presses the start button and the same cycle is repeated with respect to the next answer sheet, which is now the top sheet of the stack. However, if the machine is equipped with power driven paper feed mechanism to eject the top sheet from the stack at the completion of each cycle, then it is not necessary to stop the machine at the completion of the cycle and to press the starting button to start the next cycle, as the machine can continue operating automatically until the entire stack of answer sheets has been scored.

Referring now to the operation of the electronic circuitry in sensing or scanning the marks on the key sheet and answer sheet, respectively, it may be stated at the outset that the electronic circuitry is arranged to answer the following questions, with respect to each particular line of multiple choice spaces on the key sheet and the accompanying answer sheet which is being scored:

1. Is any answer marked on the key sheet, in any of the multiple choice positions If not, the machine takes no action. If this question is answered in the affirmative, the machine proceeds to the next question.

2. Is any answer marked in any one or more of the multiple choice answer spaces on the answer sheet, in this particular line which is being scanned at the moment? If not, the question is scored as "unanswered" by the circuitry operating as further described below. If this question is answered in the affirmative, the machine then proceeds to answer the third question.

3. Is there a mark on the answer sheet, in any space where there is no corresponding mark on the key sheet? If not, the answer as marked on the answer sheet must be correct, and is scored as correct. But if this third question is answered in the affirmative (i.e., there is a mark on the answer sheet where there is none on the key sheet) then the answer is wrong, and is scored as wrong.

It will be noted that this sequence of questions and answers, built into the circuitry according to the present invention, automatically takes care of the situation where more than one choice is deemed correct, and the situation where the student has marked an answer choice which is incorrect, even though he may also have marked one which is correct. Any incorrect answer will score the question as answered incorrectly, even though the student may also have marked the choice (or choices, if more than one is correct) which is or are regarded as correct.

Each of the photocells in the photocell units 201–205 and 271–275 in the respective reading or sensing heads, normally receives light reflected from the page, and thus has a low resistance. When a dark mark in one of the multiple choice boxes or rectangles on the sheet passes beneath the photocell, less light is reflected to it and its resistance increases. This increase in resistance will force a flow of current through the capacitor in the photocell unit (see FIG. 15 or 16, as the case may be) which is counter to the base current of the input of the associated transistor amplifier. For a mark of reasonable size and darkness, this action will cut the transistor off of its zero (0) state and will shift the output of the transistor to the negative (N) state. The output of the transistor will stay negative until the dark mark passes by, or until the capacitor discharges. Ordinarily, under normal operating conditions, the dark mark will have passed by the photocell (due to the travel of the paper carriage) before the capacitor discharges.

The lamp photocell or light photocell unit 344 receives light directly from the illuminating lamp which illuminates the key sheet or answer sheet, and needs no amplifier. It will have no effect on the system unless the illuminating lamp fails. If it does fail, it will prevent a "read" signal from being generated, because of the connection to the read signal NOR unit 320.

The various NOR circuits or units may all be of the kind disclosed, for example, in FIG. 18, and they have the characteristic that when all of the inputs are in the 0 state, the output is in the N state. However, if any input of a particular NOR unit is in the N state, then the output of that unit is in the 0 state. If a particular line is supposed to indicate a particular condition, this condition exists when the line is in the N state, and the condition does not exist when the line is in the 0 state.

Let us assume that the apparatus is functioning normally and the paper carirage is moving so that a particular line of multiple choice spaces, representing a particular question, is approaching the reading heads. All of the key photocell units 201–205 will be receiving light, and thus the outputs of all of these units will be in the 0 state. As soon as a mark on the key sheet comes into the effective range of one of the key photocell units 201–205, the output of that particular unit goes from 0 to N. Therefore, this produces an N input at the "not question present" NOR unit 214, shifting the output of the unit 214 from N to 0, or in other words producing a positive pulse in the output. The positive pulse actuates the Schmitt trigger 310, and the catuation thereof does four things.

First, the actuation of the Schmitt trigger causes the input to the "read" NOR unit 320 to go to the N state. Therefore the output of the unit 320 goes to the 0 state. Second, the actuation of the Schmitt trigger puts a positive pulse on the one-shot multivibrator 330. Third, it puts an N pulse on the emitter-follower amplifier 322, so that the emitter-follower amplifier then applies a short pulse (about one or two microseconds) to the reset circuit conductor 228, through which this short pulse is applied to all of the flip-flop units 221–225 and 281–285 to reset all of them, and applies this same short pulse to the "hold" NOR unit 340. The output of this unit 340 then goes to 0 (if it was not already at 0, which is usually the case) and this applies "hold" action to all of the photocell units 201–205 and 271–275. Fourth, the actuation of the Schmitt trigger applies a 0 input to the "hold" NOR unit 340.

The dark mark passing under one of the photocells of the key photocell units 201–205 will trigger the respective flip-flop unit 221–225. If more than one choice is marked on the key sheet for this particular question, each flip-flop corresponding to a marked choice will be triggered. The triggering of each flip-flop does two things. First, it actuates its individual one of the solenoid amplifiers 251–255, but they do not operate yet because their power supply comes from the amplifier 268 which has not yet been triggered. Second, the triggering of the flip-flop changes the input to its individual NOR unit 241–245 from 0 to N, which means that the output of that individual unit 241–245 must stay at 0.

In the meantime, the photocell units 271–275 which sense or scan the student's answer sheet, have been triggering their respective flip-flop units 281–285 in the same way that the key scanning photocell units 201–205 have triggered their respective flip-flop units 221–225. The triggering of any of the answer reading flip-flops 281–285 will shift its output going to the input of the NOR unit 288 from 0 to N, and shift the output going from the flip-flop to its individual NOR unit 241–245, respectively, from N to 0. Since there is now an N input to the NOR unit 288, the output of this unit 288 becomes 0. Thus the three NOR units which receive input from the unit 288 (namely, the units 300, 301, and 303) receive 0 input from 288 and therefore can each produce an output in the N state so far as input from unit 288 is concerned, unless they receive an N input from some other source. The unit 301 receives no input from any source except 288, so the output of 301 will be N whenever anyone of the flip-flop units 281–285 has been triggered by the presence of a mark on any of the multiple choice spaces for this particular question on the student's answer sheet. The N output from the unit 301, going to the input of the "unanswered" NOR unit 302, thus insures that the output of the unit 302 is in the 0 state, and the question is not "unanswered."

Going back now to the individual choice NOR units 241–245, it will be recalled that each of these has two inputs fed into it, one from its individual one of the key sheet flip-flops 221–225 respectively, and one from its individual one of the answer sheet flip-flops 281–285. When no mark is present to activate the respective photocell, so that its respective flip-flop has not been triggered, the output from the key sensing flip-flops 221–225 to the units 241–245 is in the 0 state, and the output from the answer sensing flip-flops 281–285 to the units 241–245 is in the N state, so that the output of each of these units 241–245 must be in the 0 state, thereby allowing the output of the next NOR gating circuit unit 289 to be in the N state. If one of the photocell units 271–275 senses a mark on the answer sheet, this operates the flip-flop 281–285, as the case may be, to produce 0 input to the respective unit 241–245. If there is no corresponding mark on the key sheet, the input of the individual unit 241–245, as the case may be, received from the key sheet flip-flop 221–225 will remain at 0, so that the output of this particular unit 241–245 will shift to the N state. This feeds an N input to the gating unit 289, thereby requiring its output to be in the 0 state. But if there is a corresponding mark on the key sheet, in the same position as the mark on the answer sheet, then although the input to the individual unit 241–245 from the flip-flops 281–285 shifts from N to 0, the input to the same unit 241–245 from the other flip-flops 221–225 will shift from 0 to N. Thus there will still be N input to the particular one of the units 241–245, so its output will still be in the 0 state.

At this point the mechanism has decided that a question was asked on the key sheet, and has decided whether or not it was answered, and again has decided whether the answer (or one of the answers, if there was more than one) was wrong, i.e., a mark on the answer where there was no mark on the key sheet.

The four NOR gating circuit units 300, 302, 303, and 304 may be referred to as the "state" units, as they respectively indicate the state of being correct, unanswered, wrong, or panic (or the reverse). The gating circuit unit 288 may be referred to as the unanswered unit, and the unit 301 may be called the not unanswered unit. The unit 289 may be called the not wrong unit, and the unit 305 the wrong unit. There are four possible combinations of unanswered, not unanswered, wrong, and not wrong, which correspond to the four states of correct, unanswered, wrong, and panic.

(a) If the combination is neither unanswered nor wrong, it must be correct.

(b) If the combination is neither not unanswered nor wrong, it must be unanswered.

(c) If it is neither not wrong nor unanswered, it must be wrong.

(d) If it is neither not unanswered nor not wrong, it must be a mistake in the circuits. To say that it is unanswered means that there are no marks on the answer paper, for this particular question. To say that it is wrong means that there must be at least one mark on the answer sheet, for this particular question. Since these are mutually exclusive events, a determination by the circuit that both of these events has happened means that there has been a mistake or malfunction which must be fixed, and this corresponds to what is here called "panic."

With respect to the inputs to the "state" units 300, 302, 303, and 304 which come from the unanswered, not unanswered, not wrong, and wrong units 288, 301, 289, and 305, respectively (and neglecting for the moment the inputs to the state units from the "read" unit 320 and the "not read" unit 352) it will be seen that only one of the state units can have two inputs both at 0 at the same time. All of the other units have at least one N input. If a question has been answered, the units 300 and 303 will each receive a 0 input from the unit 288, and the units 302 and 304 will each receive an N input from the unit 301. If the question has not been answered at all, the units 302 and 304 will receive 0 input from the unit 301. If the question has been answered correctly, the units 303 and 304 will receive N input from the unit 289, and the units 300 and 302 will receive 0 input from the unit 305. Thus both inputs of the unit 300, coming from the units 288 and 305, will be in the 0 state, making this unit ready for operation as soon as its input from the unit 352 shifts from N to 0. Similarly, if the answer is wrong, the units 303 and 304 will receive 0 input from the unit 289, but the units 300 and 302 will receive N input from the unit 305. Therefore the unit 303 (the wrong answer unit) will be set up ready for operation as soon as its input from 352 shifts from N to 0.

As above explained, the "state" gate circuits or units 300, 302, 303, and 304 are now set up to differentiate between whether there is an answer or no answer, and if there is an answer, whether it is correct or wrong. But up to this moment, these units all have a negative input from the output of the NOR gating unit 352, so the units 300, 302, 303, and 304 cannot produce a negative output regardless of what the other inputs may be. Now as the paper carriage continues its movement, the photocells of the key sheet reading or sensing group 201–205 will cease to see any mark on the key sheet, so that all of the key photocells will return to the 0 output state. Nothing happens to the flip-flop units 221–225 at this point, since they cannot be affected again until they are reset. However, all of the inputs to the NOR unit 214 will now be 0, so its output goes to N. This shift of the output from 214 (which is the input to the Schmitt trigger 310) from 0 to N lets the Schmitt trigger 310 change its outputs. The active output goes from N to 0, thereby producing a positive pulse. This affects four circuits. First, the input from the Schmitt trigger 310 to the gate 320 goes from N to 0. Second, a negative pulse is applied to the one-shot multivibrator 330, so that the output of the multivibrator going to the gate 320 shifts from N to 0. All of the inputs to the gate 320 are now at 0 (assuming that the illuminating lamp is properly burning and that the paper carriage is not at the end of its travel) so that the output from the gate 320 to the gate 352 can shift from 0 to N. Third, the operation of the Schmitt trigger 310 applies a positive pulse to the emitter-follower 322, although nothing happens in this connection at this moment. Fourth, the operation of the Schmitt trigger 310 shifts the input to the NOR gate 340 from 0 to N, so that the output of the unit 340 goes to 0, removing the signal from the emitter-follower 341 and from the "hold" bus circuit 211. This means that no photocell in the group 271–275 (for sensing the answer sheet) can trigger its flip-flop units 281–285 even if there should be an extraneous mark on the answer sheet. The flip-flop units which have already been triggered stay in the triggered condition, which applies both to the units 281–285 and to the units 221–225.

As above stated, the NOR unit 320 now has 0 inputs so that its output goes from 0 to N, and the output of the gate 352 goes from N to 0. Previously, the N output of the unit 352 has inhibited all of the NOR "state" units 300, 302, 303, and 304 from having an N output. But now that the output of the unit 352 has shifted from N to 0, whichever one of the "state" gates has its other inputs at 0 can and does now shift its output to N, thereby actuating its associated amplifier 370, 375, 377, or 384 (as the case may be) to actuate the appropriate counter or register 371, 372, 376, or 378; or, in the case of the gate 304 and amplifier 384, to operate the latching relay 385 to close a "panic" alarm circuit to indicate to the operator that something is wrong.

The electromagnetic registers 371, 372, 376, or 378 are actuated, through their respective amplifiers, and will stay actuated until the next question on the key sheet appears under the key reading or sensing head. However, if no question appears on the key sheet within the time interval built into the one-shot multivibrator 330, the output of the unit 330 will return to the N state, thus shuting off the N output of the gate 320 and shifting such output to the 0 state.

Earlier, when the output of the gate 320 was shifted from 0 to N, this triggers the amplifier 268 if the switch 353 is in the position connecting the amplifier to the output of the unit 320. The amplifier 268 then furnishes power to the marking bus circuit 267 so that the amplifiers 251–255 now have power through the conductor 267, and can cause operation of the marking tool solenoid 261–265 for the particular one or more of the multiple choices which have been marked on the key sheet and sensed by the photocell units 201–205 respectively. This arrangement will mark the correct answer for each question, regardless of whether or not the student has answered the question correctly.

However, if it is preferred to mark the correct answer only where the student has not marked the answer correctly, then the switch 353 is shifted to the other position, so that the amplifier 268 is operatively connected to the output of the NOR gate 355 instead of the output of the NOR gate 320. It will be noted that the gate 355 has input both from the gate 352 and from the correct answer gate 300. If the student has answered correctly, it will be recalled that the gate 300 will produce N output, and this output will go not only to the amplifier 370 to operate the register, but also through the conductor 356 to the input of the NOR gate 355, thereby inhibiting the gate 355 from producing an N output which would actuate the amplifier 268. Therefore, no power will be furnished to the amplifiers 251–255 of the marking solenoids 261–265. But if the student has not answered the question correctly, there will be no negative output transmitted from the unit 300 to the unit 355. Hence when the output of the gate unit 352 shifts from N to 0, this puts only a 0 input on the gate 355, so that this gate can produce N output transmitted (through the switch 353) to the amplifier 268 so that power is furnished for operating the solenoid 261–256 to show the correct answer.

If the illuminating lamp 343 which lights up the key sheet and the answer sheet goes out, this condition will be sensed by the photocell unit 344 and this, through the conductor 348, will apply N input to the gate 320, so the output thereof remains at 0 and a reading does not take place.

When the paper carriage or tray reaches either end of its travel, it closes one or the other of two normally open switches arranged in parallel, indicated schematically at 350, one side of each switch being connected to the conductor 349 leading to the fan-in of the NOR gate 320, while the other side of each switch is connected to a −12 volt source. So when the switch is closed at the end of the travel of the carriage, this applies N input to the gate 320, keeping the output thereof at 0, so that no reading can be taken until the carriage starts its travel in the opposite direction and the switch is opened again.

When the next question does reach the key sheet scanning head units 201–205, the sequence starts again. The sequence also repeats between marks (i.e., between successive questions) on the key sheet. The output of the Schmitt trigger 310 goes back from 0 to N, which changes the output of the gate unit 320 from N to 0, and changes the output of the gate unit 352 from 0 to N, thus deactivating all of the "state" gate units 300, 302, 303, and 304, ready for actuation again at the next cycle.

In the previous description, the photocell units 201–205 for sensing the key sheet have been shown (in FIG. 15) as being somewhat different from the photocell units 271–275 for sensing the answer sheets (shown in FIG. 16). The reason for this is merely that the key sheet units need to furnish more power than the answer sheet units, since they have to furnish input to the NOR gating circuit 214 as well as to the flip-flop units 221–225, whereas the photocell units which sense the answer sheet are connected only to the flip-flop units 281–285 and accordingly do not need to be so powerful. But of course the same type of units for reading the key sheet (as shown in FIG. 15) could also be used for reading the answer sheet, if desired, although there would be some saving in expense by using the simpler form of unit, shown in FIG. 16, for the answer sheet.

It is again emphasized that the electrical or electronic circuitry has been disclosed (both in the specification and in the accompanying drawings) on the assumption that the reader is skilled in the electronic art, and particularly the art of electronic computers, since many of the units are units which are known per se in the electronic computer field. The drawings are an essential part of the disclosure and are intended to convey information beyond what is specifically mentioned in words in the specification.

Moreover, those skilled in the art will recognize that many of the electronic components or units can be replaced by other components or units which can be made to accomplish the same result. For example, the various NOR gating circuits or units may be replaced by relays of known form. The various electronic units may be referred to broadly as "logic units," and this term is intended to embrace the equivalent relays, etc., as well as the electronic components.

The sensing units 201–205 and 271–275 have been described above as photocells. This is merely by way of example, since those skilled in the art will recognize that photoresistances may be used in place of photocells, making appropriate changes in other parts of the circuitry (within the skill of the art) wherever required on account of the substitution of a photoresistance for a photocell. The words "photo element" and "photo responsive element" are sometimes used herein. These terms are intended to be interpreted broadly, including a photoresistance as well as a photocell.

It is seen from the foregoing disclosure (including the drawings) that the objects and purposes of the invention are well fulfilled. It is to be understood that the disclosure is given by way of illustrative example only, rather than by way of limitation, and that without departing from the invention, the details may be varied within the scope of the appended claims.

What is claimed is:

1. Test scoring mechanism comprising photoresponsive means for visually sensing a mark made by darkening an otherwise light area in any one of a plurality of predetermined possible multiple choice answer positions on a key sheet, photoresponsive means for visually sensing a mark made by darkening an otherwise light area in any one of a plurality of predetermined possible multiple choice answer positions on an answer sheet, said key sheet and said answer sheet being substantially identical with each other except for said marks, means for comparing the position of a sensed mark on the answer sheet with the position of a sensed mark on the key sheet, a plurality of electric circuits corresponding to different states of comparison, means for activating one of said electric circuits when the comparing means determines that the position of a sensed mark on the answer sheet agrees with the position of a sensed mark on the key sheet, means for activating a different one of said electric circuits when the comparing means determines that the position of a sensed mark on the answer sheet does not agree with the position of any sensed mark on the key sheet, a plurality of correct answer marking tools, one related to each of said multiple choice answer positions on the answer sheet, and means for actuating that one of said marking tools individually related to one of the multiple choice answer positions on the answer sheet which corresponds to a darkened area of the multiple choice positions on the key sheet, when and only when no answer choice is marked in any of the multiple choice answer positions on the answer sheet or an answer is marked in a multiple choice position on the answer sheet which does not correspond to a choice marked as correct on the key sheet.

2. Test scoring mechanism comprising means for holding a key sheet and an answer sheet in predetermined relation to each other, both sheets having a plurality of spaces adapted to receive marks with respect to each of a plurality of questions, a sensing head for sensing the marks on the key sheet with respect to a particular question, a sensing head for sensing the marks on the answer sheet with respect to the same question, means for moving both sheets simultaneously past their respective sensing heads so that said heads may simultaneously sense the presence of marks on the respective sheets with respect to a particular question, and electronic comparing means responsive to said sensing heads for comparing the sensed marks on the answer sheet relating to a particular question with the sensed marks on the key sheet relating to the same question, said means for holding an answer sheet being adapted to receive a stack of answer sheets, and means controlled by the thickness of a stack of answer sheets for supporting the sensing head of the answer sheet at a constant elevation with respect to the top sheet of the stack, notwithstanding variations in the thickness of the stack.

3. A construction as defined in claim 2, wherein said answer sheet sensing head is a combined sensing and marking head and includes a plurality of marking tools selectively operable to mark on the answer sheet the correct answer choice to a particular question as determined by marking placed on the key sheet with respect to that particular question, the key sheet and the answer sheet being substantially identical with each other except for the marks thereon.

4. Test scoring mechanism comprising means for holding a key sheet and an answer sheet in predetermined relation to each other, both sheets having a plurality of spaces adapted to receive marks with respect to each of a plurality of questions, a sensing head for sensing the marks on the key sheet with respect to a particular question, a sensing head for sensing the marks on the answer sheet with respect to the same question, means for moving both sheets simultaneously past their respective sensing heads so that said heads may simultaneously sense the presence of marks on the respective sheets with respect to a particular question, electronic comparing means responsive to said sensing heads for comparing the sensed marks on the answer sheet relating to a particular question with the sensed marks on the key sheet relating to the same question, the marking spaces with respect to certain questions on both the key sheet and the answer sheet occupying only a part of the width of the respective sheet and the marking spaces with respect to certain other questions occupying only another part of the width of the sheet, and means for shifting said sensing heads from a position overlying said first mentioned part of the width of their respective sheets to a position overlying said other part of the width of their respective sheets, so that by shifting said heads they may be used at one time to sense marks on one part of the width of their respective sheets and at another time to sense marks on another part of the width of their respective sheets, wherein said means for holding a key sheet and an answer sheet includes a carriage movable in one direction to carry at least the major part of the lengths of both sheets past their respective heads and movable in an opposite direction to carry the same part of the lengths of both sheets past their respective heads again in the opposite direction, and wherein said means for shifting said heads operates substantially at one end of the travel of said carriage, so that as said carriage moves toward said one end, said respective heads will be in position to sense marks on one part of the width of their respective sheets and then as said carriage moves away from said one end, said respective heads will be in another position to sense marks on another part of the width of their respective sheets.

5. A test scoring device of the type in which an answer sheet bearing indicia is scanned by an array of sensors to produce signals indicative of the location of the indicia on the sheet, said scoring device comprising:
(a) means for releasably mounting an answer sheet in a horizontal position,
(b) a linear array of sensors,
(c) means mounting said linear array of sensors adjacent to an answer sheet held in said mounting means with said array extending generally in the direction of the width of the answer sheet,
(d) means for producing relative reciprocating motion between the answer sheet and said linear array in the direction of the length of the answer sheet,
(e) said linear array of sensors being arranged during travel in one direction of said motion to detect indicia upon a first selected width portion of the answer sheet not more than half the total width thereof, and during travel in the opposite direction to detect indicia upon a second selected width portion different from said first portion.

6. A construction as defined in claim 5 including also means for mechanically shifting said linear array of sensors in the direction of the width of the answer sheet at one end of the reciprocating motion.

7. A construction as defined in claim 6, wherein said scoring device comprises a main frame, said array of sensors is laterally movable and longitudinally fixed relative to said frame, said sheet mounting means includes a carriage arranged for longitudinal travel relative to said frame, and said motion means includes an endless chain and means drivable by said chain both for driving said carriage back and forth and for shifting said linear array of sensors.

8. A construction as defined in claim 7, wherein said means for driving said carriage is a pin-in-slot arrangement, and said shifting means is an interference arrangement.

9. A test scoring machine comprising:
(a) a carriage for holding a key sheet and an answer sheet in juxtaposed relation, both sheets bearing similar indicia defining correspondingly located spaces indicating multiple choice answer marking positions arranged in two side by side columns,
(b) a pair of sensing heads for detecting marks on the key sheet and on the answer sheet, respectively,
(c) means for reciprocating said carriage past said sensing heads for scanning the sheets across said heads,
(d) means for comparing the signals produced by said sensing heads during the reciprocating travel of said carriage and producing output signals responsively to the produced signals,
(e) each of said sensing heads being arranged to span not more than half the width of the respective sheet which it scans, and
(f) means operative synchronously with the reversal of the motion of said carriage at one end of its reciprocating travel for shifting said heads laterally relative to said carriage so that said heads scan a different width portion of the sheets during the return of said carriage than during the advance thereof.

10. A test scoring machine comprising:
(a) mounting means for supporting a stack of answer sheets with the sheets generally horizontal,
(b) a sensing head for detecting marks on the answer sheets,
(c) scanning means for producing relative reciprocating scanning motion between said head and said mounting means,
(d) means responsive to variations in the height of the stack of answer sheets for supporting said head always at a predetermined spacing above the top sheet of the stack during the scanning motion,
(e) means for holding a key sheet,
(f) a sensing head for detecting marks on the key sheet, and
(g) means for comparing a mark detected on the key sheet with a mark detected on the top sheet of the stack of answer sheets.

11. A construction as defined in claim 10, including also means for raising said head farther from the answer sheets than said predetermined spacing during a terminal portion of said scanning motion at one end thereof, thereby to facilitate removal of the top sheet at the completion of each full reciprocation.

12. A test scoring machine for scoring the correctness of multiple choice answers marked on an answer sheet in comparison to markings of acceptable choice on a key sheet, said machine comprising means for holding a key sheet and an answer sheet in cooperative relation to each other, and means for sensing and comparing a choice marked on an answer sheet with a choice marked on the key sheet, said means for sensing a mark on an answer sheet including a sensing head comprising a row of elongated narrow compartments in fixed relation to each other, alternate ones of said compartments being so spaced as to be alined with certain of the possible marking positions of an answer sheet to be sensed by said sensing head, and a photo responsive element mounted in each of said alternate compartments in position to receive varying amounts of light from the portion of the answer sheet alined with its respective compartment, depending upon whether a darkening mark has or has not been placed on the alined portion of the answer sheet, an elongated marking tool mounted in each of the other compartments intermediate said alternate compartments, spring means normally keeping each marking tool in an elevated position above an answer sheet being sensed by said sensing head, and means controlled by said electric circuits for moving a selected one of said marking tools against the force of said spring means and into contact with the answer sheet being sensed by said sensing head, to make a mark thereon.

13. A construction as defined in claim 12, in which each of said marking tools includes a crayon portion for contact with the answer sheet.

14. The method of scoring multiple choice test answer sheets of the type having for each question a series of spaces which may be marked to indicate an answer choice, said method comprising the steps of:
(a) marking with a relatively dark mark on a first answer sheet those spaces corresponding to answer choices which will be regarded as correct, so as to provide a key sheet,
(b) causing a person to be tested to mark with a relatively dark mark on a separate answer sheet substantially identical with the first answer sheet except for the marks thereon, those spaces corresponding to his answer choices,
(c) providing two photo responsive scanning heads each responsive to differences in light reflected from light areas and marked darker areas, respectively, of a sheet beneath the head,
(d) placing the key sheet and the answer sheet side by side on a movable carrier,
(e) moving the carrier to carry the key sheet and the answer sheet simultaneously beneath the respective photo responsive scanning heads,
(f) electrically comparing the response of one scanning head to the light and dark areas of the sheet beneath it to the response of the other scanning head to the light and dark areas of the sheet beneath it, and
(g) determining the correctness, incorrectness, or other characteristics of the answer choices marked on the answer sheet on the basis of comparing the responses of the two scanning heads to the respective light and dark areas of the respective sheets beneath them,
(h) and placing a correction mark on said separate answer sheet alongside the space corresponding to the correct answer choice of each question not answered correctly, to indicate which answer choice is correct.

References Cited

UNITED STATES PATENTS

| | | | |
|---|---|---|---|
| 3,315,377 | 4/1967 | Stillwell et al. | 35—48 |
| 2,275,590 | 3/1942 | Johnson | 35—48 |
| 2,944,734 | 7/1960 | Martin | 35—48 |
| 3,050,248 | 8/1962 | Lindquist | 35—48 |
| 3,201,569 | 8/1965 | Conron. | |
| 3,212,203 | 10/1965 | Atkinson | 35—48 |
| 3,216,132 | 11/1965 | Flaherty et al. | 35—48 |
| 3,284,929 | 11/1966 | Azure | 35—48 |

EUGENE R. CAPOZIO, *Primary Examiner.*

W. W. NIELSEN, *Assistant Examiner.*